United States Patent
Zuili

(10) Patent No.: US 7,950,066 B1
(45) Date of Patent: May 24, 2011

(54) METHOD AND SYSTEM FOR RESTRICTING USE OF A CLIPBOARD APPLICATION

(75) Inventor: Patrick Zuili, Palo Alto, CA (US)

(73) Assignee: Guardian Data Storage, LLC, Wilmington, DE (US)

(*) Notice: Subject to any disclaimer, the term of this patent is extended or adjusted under 35 U.S.C. 154(b) by 1134 days.

(21) Appl. No.: 10/028,397

(22) Filed: Dec. 21, 2001

(51) Int. Cl.
- G06F 17/30 (2006.01)
- G06F 7/04 (2006.01)
- H04L 29/06 (2006.01)
- G06F 3/048 (2006.01)

(52) U.S. Cl. .......................... 726/33; 713/165; 715/770
(58) Field of Classification Search .................... 726/33; 713/165; 715/770
See application file for complete search history.

(56) References Cited

U.S. PATENT DOCUMENTS

| | | | |
|---|---|---|---|
| 4,203,166 A | 5/1980 | Ehrsam et al. |
| 4,238,854 A | 12/1980 | Ehrsam et al. |
| 4,423,387 A | 12/1983 | Sempel |
| 4,734,568 A | 3/1988 | Watanabe |
| 4,757,533 A | 7/1988 | Allen et al. |
| 4,796,220 A | 1/1989 | Wolfe |
| 4,799,258 A | 1/1989 | Davies |
| 4,827,508 A | 5/1989 | Shear |
| 4,887,204 A | 12/1989 | Johnson et al. |
| 4,888,800 A | 12/1989 | Marshall et al. |
| 4,912,552 A | 3/1990 | Allison et al. |
| 4,972,472 A | 11/1990 | Brown et al. |
| 5,032,979 A | 7/1991 | Hecht et al. |
| 5,052,040 A | 9/1991 | Preston et al. |
| 5,058,164 A | 10/1991 | Elmer et al. |
| 5,144,660 A | 9/1992 | Rose |
| 5,204,897 A | 4/1993 | Wyman |
| 5,212,788 A | 5/1993 | Lomet et al. |
| 5,220,657 A | 6/1993 | Bly et al. |
| 5,235,641 A | 8/1993 | Nozawa et al. |
| 5,247,575 A | 9/1993 | Sprague et al. |
| 5,276,735 A | 1/1994 | Boebert et al. |
| 5,301,247 A | 4/1994 | Rasmussen et al. |
| 5,319,705 A | 6/1994 | Halter et al. |
| 5,369,702 A | 11/1994 | Shanton |
| 5,375,169 A | 12/1994 | Seheidt et al. |
| 5,404,404 A | 4/1995 | Novorita |
| 5,406,628 A | 4/1995 | Beller et al. |

(Continued)

FOREIGN PATENT DOCUMENTS

EP 0 672 991 A2 9/1995

(Continued)

OTHER PUBLICATIONS

"Security Options". Dec. 20, 2001. DC & Co. pp. 1-2.*

(Continued)

*Primary Examiner* — Michael Pyzocha
(74) *Attorney, Agent, or Firm* — Sterne, Kessler, Goldstein & Fox P.L.L.C.

(57) ABSTRACT

Techniques and mechanisms for controlling copying of content from a secured file or secured document are disclosed. In one embodiment, the techniques or mechanisms operate to control clipboard usage such that content from a secured document of one application is not able to be copied to another application or a different document of another application by way of a clipboard. According to another embodiment, alternate content is copied to another application or a different document of another application instead of the content from the secured document.

28 Claims, 11 Drawing Sheets

U.S. PATENT DOCUMENTS

| | | |
|---|---|---|
| 5,414,852 A | 5/1995 | Kramer et al. |
| 5,434,918 A | 7/1995 | Kung et al. |
| 5,461,710 A | 10/1995 | Bloomfield et al. |
| 5,467,342 A | 11/1995 | Logston et al. |
| 5,495,533 A | 2/1996 | Linehan et al. |
| 5,497,422 A | 3/1996 | Tysen et al. |
| 5,499,297 A | 3/1996 | Boebert |
| 5,502,766 A | 3/1996 | Boebert et al. |
| 5,535,375 A | 7/1996 | Eshel et al. |
| 5,557,765 A | 9/1996 | Lipner et al. |
| 5,570,108 A | 10/1996 | McLaughlin et al. |
| 5,584,023 A | 12/1996 | Hsu |
| 5,600,722 A | 2/1997 | Yamaguchi et al. |
| 5,606,663 A | 2/1997 | Kadooka |
| 5,619,576 A | 4/1997 | Shaw |
| 5,638,501 A | 6/1997 | Gough et al. |
| 5,640,388 A | 6/1997 | Woodhead et al. |
| 5,655,119 A | 8/1997 | Davy |
| 5,661,668 A | 8/1997 | Yemini et al. |
| 5,661,806 A | 8/1997 | Nevoux et al. |
| 5,671,412 A | 9/1997 | Christiano |
| 5,673,316 A | 9/1997 | Auerbach et al. |
| 5,677,953 A | 10/1997 | Dolphin |
| 5,680,452 A | 10/1997 | Shanton |
| 5,682,537 A | 10/1997 | Davies et al. |
| 5,684,987 A | 11/1997 | Mamiya et al. |
| 5,689,688 A | 11/1997 | Strong et al. |
| 5,689,718 A | 11/1997 | Sakurai et al. |
| 5,699,428 A | 12/1997 | McDonnal et al. |
| 5,708,709 A | 1/1998 | Rose |
| 5,715,403 A | 2/1998 | Stefik |
| 5,717,755 A | 2/1998 | Shanton |
| 5,719,941 A | 2/1998 | Swift et al. |
| 5,720,033 A | 2/1998 | Deo |
| 5,729,734 A | 3/1998 | Parker et al. |
| 5,732,265 A | 3/1998 | Dewitt et al. |
| 5,745,573 A | 4/1998 | Lipner et al. |
| 5,745,750 A | 4/1998 | Porcaro |
| 5,748,736 A | 5/1998 | Mittra |
| 5,751,287 A | 5/1998 | Hahn et al. |
| 5,757,920 A | 5/1998 | Misra et al. |
| 5,765,152 A | 6/1998 | Erickson |
| 5,768,381 A | 6/1998 | Hawthorne |
| 5,778,065 A | 7/1998 | Hauser et al. |
| 5,778,350 A | 7/1998 | Adams et al. |
| 5,781,711 A | 7/1998 | Austin et al. |
| 5,787,169 A | 7/1998 | Eldridge et al. |
| 5,787,173 A | 7/1998 | Seheidt et al. |
| 5,787,175 A | 7/1998 | Carter |
| 5,790,789 A | 8/1998 | Suarez |
| 5,790,790 A | 8/1998 | Smith et al. |
| 5,813,009 A | 9/1998 | Johnson et al. |
| 5,821,933 A | 10/1998 | Keller et al. |
| 5,825,876 A | 10/1998 | Peterson |
| 5,835,592 A | 11/1998 | Chang et al. |
| 5,835,601 A | 11/1998 | Shimbo et al. |
| 5,850,443 A | 12/1998 | Van Oorschot et al. |
| 5,857,189 A | 1/1999 | Riddle |
| 5,862,325 A | 1/1999 | Reed et al. |
| 5,870,468 A | 2/1999 | Harrison |
| 5,870,477 A | 2/1999 | Sasaki et al. |
| 5,881,287 A * | 3/1999 | Mast .......................... 717/127 |
| 5,892,900 A | 4/1999 | Ginter et al. |
| 5,893,084 A | 4/1999 | Morgan et al. |
| 5,898,781 A | 4/1999 | Shanton |
| 5,922,073 A | 7/1999 | Shimada |
| 5,923,754 A | 7/1999 | Angelo et al. |
| 5,933,498 A | 8/1999 | Schneck et al. |
| 5,944,794 A | 8/1999 | Okamoto et al. |
| 5,953,419 A | 9/1999 | Lohstroh et al. |
| 5,968,177 A | 10/1999 | Batten-Carew et al. |
| 5,970,502 A | 10/1999 | Salkewicz et al. |
| 5,978,802 A | 11/1999 | Hurvig |
| 5,987,440 A | 11/1999 | O'Neil et al. |
| 5,991,879 A | 11/1999 | Still |
| 5,999,907 A | 12/1999 | Donner |
| 6,011,847 A | 1/2000 | Follendore, III |
| 6,014,730 A | 1/2000 | Ohtsu |
| 6,023,506 A | 2/2000 | Ote et al. |
| 6,031,584 A | 2/2000 | Gray |
| 6,032,216 A | 2/2000 | Schmuck et al. |
| 6,035,404 A | 3/2000 | Zhao |
| 6,038,322 A | 3/2000 | Harkins |
| 6,044,155 A | 3/2000 | Thomlinson et al. |
| 6,055,314 A | 4/2000 | Spies et al. |
| 6,058,424 A | 5/2000 | Dixon et al. |
| 6,061,790 A | 5/2000 | Bodnar |
| 6,069,057 A | 5/2000 | Wu |
| 6,070,244 A | 5/2000 | Orchier et al. |
| 6,085,323 A | 7/2000 | Shimizu et al. |
| 6,088,717 A | 7/2000 | Reed et al. |
| 6,088,805 A | 7/2000 | Davis et al. |
| 6,098,056 A | 8/2000 | Rusnak et al. |
| 6,101,507 A | 8/2000 | Cane et al. |
| 6,105,131 A | 8/2000 | Carroll |
| 6,122,630 A | 8/2000 | Strickler et al. |
| 6,134,327 A | 10/2000 | Van Oorschot |
| 6,134,658 A | 10/2000 | Multerer et al. |
| 6,134,660 A | 10/2000 | Boneh et al. |
| 6,134,664 A | 10/2000 | Walker |
| 6,141,754 A | 10/2000 | Choy |
| 6,145,084 A | 11/2000 | Zuili |
| 6,148,338 A | 11/2000 | Lachelt et al. |
| 6,158,010 A | 12/2000 | Moriconi et al. |
| 6,161,139 A | 12/2000 | Win et al. |
| 6,182,142 B1 | 1/2001 | Win et al. |
| 6,185,684 B1 | 2/2001 | Pravetz et al. |
| 6,192,408 B1 | 2/2001 | Vahalia et al. |
| 6,199,070 B1 | 3/2001 | Polo-Wood et al. |
| 6,205,549 B1 | 3/2001 | Pravetz et al. |
| 6,212,561 B1 | 4/2001 | Sitaraman et al. |
| 6,223,285 B1 | 4/2001 | Komuro et al. |
| 6,226,618 B1 | 5/2001 | Downs et al. |
| 6,226,745 B1 | 5/2001 | Wiederhold et al. |
| 6,240,188 B1 | 5/2001 | Dondeti et al. |
| 6,249,755 B1 | 6/2001 | Yemini et al. |
| 6,249,873 B1 | 6/2001 | Richard et al. |
| 6,253,193 B1 | 6/2001 | Ginter et al. |
| 6,260,040 B1 | 7/2001 | Kauffman et al. |
| 6,260,141 B1 | 7/2001 | Park |
| 6,263,348 B1 | 7/2001 | Kathrow et al. |
| 6,266,420 B1 | 7/2001 | Langford et al. |
| 6,272,631 B1 | 8/2001 | Thomlinson et al. |
| 6,272,632 B1 | 8/2001 | Carman et al. |
| 6,282,649 B1 | 8/2001 | Lambert et al. |
| 6,289,450 B1 | 9/2001 | Pensak et al. |
| 6,289,458 B1 | 9/2001 | Garg et al. |
| 6,292,895 B1 | 9/2001 | Baltzley |
| 6,292,899 B1 | 9/2001 | McBride |
| 6,295,361 B1 | 9/2001 | Kadansky et al. |
| 6,299,069 B1 | 10/2001 | Shona |
| 6,301,614 B1 | 10/2001 | Najork et al. |
| 6,308,256 B1 | 10/2001 | Folmsbee |
| 6,308,273 B1 | 10/2001 | Goertzel et al. |
| 6,314,408 B1 | 11/2001 | Salas et al. |
| 6,314,409 B2 | 11/2001 | Schneck et al. |
| 6,317,777 B1 | 11/2001 | Skarbo et al. |
| 6,332,025 B2 | 12/2001 | Takahashi et al. |
| 6,336,114 B1 | 1/2002 | Garrison |
| 6,339,423 B1 | 1/2002 | Sampson et al. |
| 6,339,825 B2 | 1/2002 | Pensak et al. |
| 6,341,164 B1 | 1/2002 | Dilkie et al. |
| 6,343,316 B1 | 1/2002 | Sakata |
| 6,347,374 B1 | 2/2002 | Drake et al. |
| 6,349,337 B1 | 2/2002 | Parsons et al. |
| 6,351,813 B1 | 2/2002 | Mooney et al. |
| 6,356,903 B1 | 3/2002 | Baxter et al. |
| 6,356,941 B1 | 3/2002 | Cohen |
| 6,357,010 B1 | 3/2002 | Viets et al. |
| 6,363,480 B1 | 3/2002 | Perlman |
| 6,370,249 B1 | 4/2002 | Van Oorschot |
| 6,381,698 B1 | 4/2002 | Devanbu et al. |
| 6,385,644 B1 | 5/2002 | Devine et al. |
| 6,389,433 B1 | 5/2002 | Bolosky et al. |
| 6,389,538 B1 | 5/2002 | Gruse et al. |
| 6,393,420 B1 | 5/2002 | Peters |
| 6,405,315 B1 | 6/2002 | Burns et al. |

| Patent | Date | Name |
|---|---|---|
| 6,405,318 B1 | 6/2002 | Rowland |
| 6,408,404 B1 | 6/2002 | Ladwig |
| 6,421,714 B1 | 7/2002 | Rai et al. |
| 6,442,688 B1 | 8/2002 | Moses et al. |
| 6,442,695 B1 | 8/2002 | Dutcher et al. |
| 6,446,090 B1 | 9/2002 | Hart |
| 6,449,721 B1 | 9/2002 | Pensak et al. |
| 6,453,353 B1 | 9/2002 | Win et al. |
| 6,453,419 B1 | 9/2002 | Flint et al. |
| 6,466,932 B1 | 10/2002 | Dennis et al. |
| 6,477,544 B1 | 11/2002 | Bolosky et al. |
| 6,487,662 B1 | 11/2002 | Kharon et al. |
| 6,490,680 B1 | 12/2002 | Scheidt et al. |
| 6,505,300 B2 | 1/2003 | Chan et al. |
| 6,510,349 B1 | 1/2003 | Schneck et al. |
| 6,519,700 B1 | 2/2003 | Ram et al. |
| 6,529,956 B1 | 3/2003 | Smith et al. |
| 6,530,020 B1 | 3/2003 | Aoki |
| 6,530,024 B1 | 3/2003 | Proctor |
| 6,542,608 B2 | 4/2003 | Scheidt et al. |
| 6,549,623 B1 | 4/2003 | Scheidt et al. |
| 6,550,011 B1 | 4/2003 | Sims, III |
| 6,557,039 B1 | 4/2003 | Leong et al. |
| 6,567,914 B1 | 5/2003 | Just et al. |
| 6,571,291 B1 | 5/2003 | Chow |
| 6,574,733 B1 | 6/2003 | Langford |
| 6,584,466 B1 | 6/2003 | Serbinis et al. |
| 6,587,946 B1 | 7/2003 | Jakobsson |
| 6,588,673 B1 | 7/2003 | Chan et al. |
| 6,591,295 B1 * | 7/2003 | Diamond et al. ............. 709/217 |
| 6,594,662 B1 | 7/2003 | Sieffert et al. |
| 6,598,161 B1 | 7/2003 | Kluttz et al. |
| 6,601,170 B1 | 7/2003 | Wallace, Jr. |
| 6,603,857 B1 | 8/2003 | Batten-Carew et al. |
| 6,608,636 B1 | 8/2003 | Roseman |
| 6,611,599 B2 | 8/2003 | Natarajan |
| 6,611,846 B1 | 8/2003 | Stoodley |
| 6,615,349 B1 | 9/2003 | Hair |
| 6,615,350 B1 | 9/2003 | Schell et al. |
| 6,625,650 B2 | 9/2003 | Stelliga |
| 6,625,734 B1 | 9/2003 | Marvit et al. |
| 6,629,243 B1 | 9/2003 | Kleinman et al. |
| 6,633,311 B1 | 10/2003 | Douvikas et al. |
| 6,640,307 B2 | 10/2003 | Viets et al. |
| 6,646,515 B2 | 11/2003 | Jun et al. |
| 6,647,388 B2 | 11/2003 | Numao et al. |
| 6,678,835 B1 | 1/2004 | Shah et al. |
| 6,683,954 B1 | 1/2004 | Searle |
| 6,687,822 B1 | 2/2004 | Jakobsson |
| 6,693,652 B1 | 2/2004 | Barrus et al. |
| 6,698,022 B1 | 2/2004 | Wu |
| 6,711,683 B1 | 3/2004 | Laczko et al. |
| 6,718,361 B1 | 4/2004 | Basani et al. |
| 6,735,701 B1 | 5/2004 | Jacobson |
| 6,738,908 B1 | 5/2004 | Bonn et al. |
| 6,751,573 B1 | 6/2004 | Burch |
| 6,754,657 B2 | 6/2004 | Lomet |
| 6,754,665 B1 | 6/2004 | Kawamoto et al. |
| 6,775,779 B1 | 8/2004 | England et al. |
| 6,779,031 B1 | 8/2004 | Picher-Dempsey |
| 6,782,403 B1 | 8/2004 | Kino et al. |
| 6,801,999 B1 | 10/2004 | Venkatesan et al. |
| 6,807,534 B1 | 10/2004 | Erickson |
| 6,807,636 B2 | 10/2004 | Hartman et al. |
| 6,810,389 B1 | 10/2004 | Meyer |
| 6,810,479 B1 | 10/2004 | Barlow et al. |
| 6,816,871 B2 | 11/2004 | Lee |
| 6,816,969 B2 | 11/2004 | Miyazaki et al. |
| 6,826,698 B1 | 11/2004 | Minkin et al. |
| 6,834,333 B2 | 12/2004 | Hayashi et al. |
| 6,834,341 B1 | 12/2004 | Bahl et al. |
| 6,842,825 B2 | 1/2005 | Geiner et al. |
| 6,845,452 B1 | 1/2005 | Roddy et al. |
| 6,851,050 B2 | 2/2005 | Singhal et al. |
| 6,862,103 B1 | 3/2005 | Miura et al. |
| 6,865,555 B2 | 3/2005 | Novak |
| 6,870,920 B2 | 3/2005 | Henits |
| 6,874,139 B2 * | 3/2005 | Krueger et al. ............. 717/127 |
| 6,877,010 B2 | 4/2005 | Smith-Semedo et al. |
| 6,877,136 B2 | 4/2005 | Bess et al. |
| 6,882,994 B2 | 4/2005 | Yoshimura et al. |
| 6,889,210 B1 | 5/2005 | Vainstein |
| 6,891,953 B1 | 5/2005 | DeMello et al. |
| 6,892,201 B2 | 5/2005 | Brown et al. |
| 6,892,306 B1 | 5/2005 | En-Seung et al. |
| 6,898,627 B1 | 5/2005 | Sekiguchi |
| 6,907,034 B1 | 6/2005 | Begis |
| 6,909,708 B1 | 6/2005 | Krishnaswamy et al. |
| 6,915,425 B2 | 7/2005 | Xu et al. |
| 6,915,434 B1 | 7/2005 | Kuroda et al. |
| 6,915,435 B1 | 7/2005 | Merriam |
| 6,920,558 B2 | 7/2005 | Sames et al. |
| 6,922,785 B1 | 7/2005 | Brewer et al. |
| 6,924,425 B2 | 8/2005 | Naples et al. |
| 6,931,450 B2 | 8/2005 | Howard et al. |
| 6,931,530 B2 | 8/2005 | Pham et al. |
| 6,931,597 B1 | 8/2005 | Prakash |
| 6,938,042 B2 | 8/2005 | Aboulhosn et al. |
| 6,941,355 B1 | 9/2005 | Donaghey et al. |
| 6,941,456 B2 | 9/2005 | Wilson |
| 6,941,472 B2 | 9/2005 | Moriconi et al. |
| 6,944,183 B1 | 9/2005 | Iyer et al. |
| 6,947,556 B1 | 9/2005 | Matyas, Jr. et al. |
| 6,950,818 B2 | 9/2005 | Dennis et al. |
| 6,950,936 B2 | 9/2005 | Subramaniam et al. |
| 6,950,941 B1 | 9/2005 | Lee et al. |
| 6,950,943 B1 | 9/2005 | Bacha et al. |
| 6,952,780 B2 | 10/2005 | Olsen et al. |
| 6,957,261 B2 | 10/2005 | Lortz |
| 6,959,308 B2 | 10/2005 | Gramsamer et al. |
| 6,961,849 B1 | 11/2005 | Davis et al. |
| 6,961,855 B1 | 11/2005 | Rich et al. |
| 6,968,060 B1 | 11/2005 | Pinkas |
| 6,968,456 B1 | 11/2005 | Tripathi et al. |
| 6,971,018 B1 | 11/2005 | Witt et al. |
| 6,976,259 B1 | 12/2005 | Dutta et al. |
| 6,978,366 B1 | 12/2005 | Ignatchenko et al. |
| 6,978,376 B2 | 12/2005 | Giroux et al. |
| 6,978,377 B1 | 12/2005 | Asano et al. |
| 6,987,752 B1 | 1/2006 | Sarraf et al. |
| 6,988,133 B1 | 1/2006 | Zavalkovsky et al. |
| 6,988,199 B2 | 1/2006 | Toh et al. |
| 6,993,135 B2 | 1/2006 | Ishibashi |
| 6,996,718 B1 | 2/2006 | Henry et al. |
| 7,000,150 B1 | 2/2006 | Zunino et al. |
| 7,003,117 B2 | 2/2006 | Kacker et al. |
| 7,003,560 B1 | 2/2006 | Mullen et al. |
| 7,003,661 B2 | 2/2006 | Beattie et al. |
| 7,010,689 B1 | 3/2006 | Matyas et al. |
| 7,010,809 B2 | 3/2006 | Hori et al. |
| 7,013,332 B2 | 3/2006 | Friedel et al. |
| 7,013,485 B2 | 3/2006 | Brown et al. |
| 7,020,645 B2 | 3/2006 | Bisbee et al. |
| 7,024,427 B2 | 4/2006 | Bobbitt et al. |
| 7,035,854 B2 | 4/2006 | Hsiao et al. |
| 7,035,910 B1 | 4/2006 | Dutta et al. |
| 7,043,637 B2 | 5/2006 | Bolosky et al. |
| 7,046,807 B2 | 5/2006 | Hirano et al. |
| 7,047,404 B1 | 5/2006 | Doonan et al. |
| 7,051,213 B1 | 5/2006 | Kobayashi et al. |
| 7,058,696 B1 | 6/2006 | Phillips et al. |
| 7,058,978 B2 | 6/2006 | Feuerstein et al. |
| 7,073,063 B2 | 7/2006 | Peinado |
| 7,073,073 B1 | 7/2006 | Nonaka et al. |
| 7,076,067 B2 | 7/2006 | Raike et al. |
| 7,076,312 B2 | 7/2006 | Law et al. |
| 7,076,469 B2 * | 7/2006 | Schreiber et al. ............. 705/57 |
| 7,076,633 B2 | 7/2006 | Tormasov et al. |
| 7,080,077 B2 | 7/2006 | Ramamurthy et al. |
| 7,095,853 B2 | 8/2006 | Morishita |
| 7,096,266 B2 | 8/2006 | Lewin et al. |
| 7,099,926 B1 | 8/2006 | Ims et al. |
| 7,103,911 B2 | 9/2006 | Spies et al. |
| 7,107,185 B1 | 9/2006 | Yemini et al. |
| 7,107,269 B2 | 9/2006 | Arlein et al. |
| 7,107,416 B2 | 9/2006 | Stuart et al. |
| 7,113,594 B2 | 9/2006 | Boneh et al. |
| 7,116,785 B2 | 10/2006 | Okaue |

| | | | | | | |
|---|---|---|---|---|---|---|
| 7,117,322 B2 | 10/2006 | Hochberg et al. | | 7,730,543 B1 | 6/2010 | Nath |
| 7,120,635 B2 | 10/2006 | Bhide et al. | | 7,748,045 B2 | 6/2010 | Kenrich et al. |
| 7,120,757 B2 | 10/2006 | Tsuge | | 2001/0000265 A1* | 4/2001 | Schreiber et al. ............ 713/201 |
| 7,124,164 B1 | 10/2006 | Chemtob | | 2001/0011254 A1 | 8/2001 | Clark |
| 7,126,957 B1 | 10/2006 | Isukapalli et al. | | 2001/0018743 A1 | 8/2001 | Morishita |
| 7,130,964 B2 | 10/2006 | Ims et al. | | 2001/0021255 A1 | 9/2001 | Ishibashi |
| 7,131,071 B2 | 10/2006 | Gune et al. | | 2001/0021926 A1 | 9/2001 | Schneck et al. |
| 7,134,041 B2 | 11/2006 | Murray et al. | | 2001/0023421 A1 | 9/2001 | Numao et al. |
| 7,136,903 B1 | 11/2006 | Phillips et al. | | 2001/0032181 A1 | 10/2001 | Jakstadt et al. |
| 7,139,399 B1 | 11/2006 | Zimmermann | | 2001/0033611 A1 | 10/2001 | Grimwood et al. |
| 7,140,044 B2 | 11/2006 | Redlich et al. | | 2001/0034839 A1 | 10/2001 | Karjoth et al. |
| 7,145,898 B1 | 12/2006 | Elliott | | 2001/0042110 A1 | 11/2001 | Furusawa et al. |
| 7,146,388 B2 | 12/2006 | Stakutis et al. | | 2001/0044903 A1 | 11/2001 | Yamamoto et al. |
| 7,146,498 B1 | 12/2006 | Takechi et al. | | 2001/0056541 A1 | 12/2001 | Matsuzaki et al. |
| 7,159,036 B2 | 1/2007 | Hinchliffe et al. | | 2001/0056550 A1 | 12/2001 | Lee |
| 7,168,094 B1 | 1/2007 | Fredell | | 2002/0003886 A1 | 1/2002 | Hillegass et al. |
| 7,171,557 B2 | 1/2007 | Kallahalla et al. | | 2002/0007335 A1 | 1/2002 | Millard et al. |
| 7,174,563 B1 | 2/2007 | Brownlie et al. | | 2002/0010679 A1 | 1/2002 | Felsher |
| 7,177,427 B1 | 2/2007 | Komuro et al. | | 2002/0013772 A1 | 1/2002 | Peinado |
| 7,177,839 B1 | 2/2007 | Claxton et al. | | 2002/0016921 A1 | 2/2002 | Olsen et al. |
| 7,178,033 B1* | 2/2007 | Garcia .......................... 713/184 | | 2002/0016922 A1 | 2/2002 | Richards et al. |
| 7,181,017 B1 | 2/2007 | Nagel et al. | | 2002/0023208 A1 | 2/2002 | Jancula |
| 7,185,364 B2 | 2/2007 | Knouse et al. | | 2002/0026321 A1 | 2/2002 | Faris et al. |
| 7,187,033 B2 | 3/2007 | Pendharkar | | 2002/0027886 A1 | 3/2002 | Fischer et al. |
| 7,188,181 B1 | 3/2007 | Squier et al. | | 2002/0029340 A1 | 3/2002 | Pensak et al. |
| 7,194,764 B2 | 3/2007 | Martherus et al. | | 2002/0031230 A1 | 3/2002 | Sweet et al. |
| 7,197,638 B1 | 3/2007 | Grawrock et al. | | 2002/0035624 A1 | 3/2002 | Kim |
| 7,200,747 B2 | 4/2007 | Riedel et al. | | 2002/0036984 A1 | 3/2002 | Chiussi et al. |
| 7,203,317 B2 | 4/2007 | Kallahalla et al. | | 2002/0041391 A1 | 4/2002 | Bannai |
| 7,203,968 B2 | 4/2007 | Asano et al. | | 2002/0042756 A1 | 4/2002 | Kumar et al. |
| 7,219,230 B2 | 5/2007 | Riedel et al. | | 2002/0046350 A1 | 4/2002 | Lordemann et al. |
| 7,224,795 B2 | 5/2007 | Takada et al. | | 2002/0050098 A1 | 5/2002 | Chan |
| 7,225,256 B2 | 5/2007 | Villavicencio | | 2002/0052981 A1* | 5/2002 | Yasuda ........................ 709/320 |
| 7,227,953 B2 | 6/2007 | Shida | | 2002/0056042 A1 | 5/2002 | Van Der Kaay et al. |
| 7,233,948 B1 | 6/2007 | Shamoon et al. | | 2002/0062240 A1 | 5/2002 | Morinville |
| 7,237,002 B1 | 6/2007 | Estrada et al. | | 2002/0062245 A1 | 5/2002 | Niu et al. |
| 7,249,044 B2 | 7/2007 | Kumar et al. | | 2002/0062451 A1 | 5/2002 | Scheidt et al. |
| 7,249,251 B2 | 7/2007 | Todd et al. | | 2002/0069077 A1 | 6/2002 | Brophy et al. |
| 7,260,555 B2 | 8/2007 | Rossmann et al. | | 2002/0069272 A1 | 6/2002 | Kim et al. |
| 7,265,764 B2 | 9/2007 | Alben et al. | | 2002/0069363 A1 | 6/2002 | Winburn |
| 7,266,684 B2 | 9/2007 | Jancula | | 2002/0073320 A1 | 6/2002 | Rinkevich et al. |
| 7,280,658 B2 | 10/2007 | Amini et al. | | 2002/0077985 A1* | 6/2002 | Kobata et al. ................... 705/51 |
| 7,281,272 B1* | 10/2007 | Rubin et al. ..................... 726/26 | | 2002/0077986 A1 | 6/2002 | Kobata et al. |
| 7,287,055 B2 | 10/2007 | Smith et al. | | 2002/0077988 A1 | 6/2002 | Sasaki et al. |
| 7,287,058 B2 | 10/2007 | Loveland et al. | | 2002/0078239 A1 | 6/2002 | Howard et al. |
| 7,290,148 B2 | 10/2007 | Tozawa et al. | | 2002/0078361 A1 | 6/2002 | Giroux et al. |
| 7,308,702 B1 | 12/2007 | Thomsen et al. | | 2002/0087479 A1 | 7/2002 | Malcolm |
| 7,313,824 B1* | 12/2007 | Bala et al. ........................ 726/27 | | 2002/0089602 A1 | 7/2002 | Sullivan |
| 7,319,752 B2 | 1/2008 | Asano et al. | | 2002/0091532 A1 | 7/2002 | Viets et al. |
| 7,340,600 B1 | 3/2008 | Corella | | 2002/0091745 A1 | 7/2002 | Ramamurthy et al. |
| 7,359,517 B1 | 4/2008 | Rowe | | 2002/0091928 A1 | 7/2002 | Bouchard et al. |
| 7,362,868 B2 | 4/2008 | Madoukh et al. | | 2002/0093527 A1 | 7/2002 | Sherlock et al. |
| 7,380,120 B1 | 5/2008 | Garcia | | 2002/0099947 A1 | 7/2002 | Evans |
| 7,383,586 B2 | 6/2008 | Cross et al. | | 2002/0112035 A1 | 8/2002 | Carey et al. |
| 7,386,529 B2 | 6/2008 | Kiessig et al. | | 2002/0120851 A1 | 8/2002 | Clarke |
| 7,386,599 B1 | 6/2008 | Piersol et al. | | 2002/0124180 A1 | 9/2002 | Hagman |
| 7,401,220 B2 | 7/2008 | Bolosky et al. | | 2002/0129158 A1 | 9/2002 | Zhang et al. |
| 7,406,596 B2 | 7/2008 | Tararukhina et al. | | 2002/0129235 A1 | 9/2002 | Okamoto et al. |
| 7,415,608 B2 | 8/2008 | Bolosky et al. | | 2002/0133500 A1 | 9/2002 | Arlein et al. |
| 7,434,048 B1 | 10/2008 | Shapiro et al. | | 2002/0133699 A1 | 9/2002 | Pueschel |
| 7,454,612 B2 | 11/2008 | Bolosky et al. | | 2002/0138571 A1 | 9/2002 | Trinon et al. |
| 7,461,157 B2 | 12/2008 | Ahlard et al. | | 2002/0138726 A1 | 9/2002 | Sames et al. |
| 7,461,405 B2 | 12/2008 | Boudreault et al. | | 2002/0138762 A1 | 9/2002 | Horne |
| 7,478,243 B2 | 1/2009 | Bolosky et al. | | 2002/0143710 A1 | 10/2002 | Liu |
| 7,478,418 B2 | 1/2009 | Supramaniam et al. | | 2002/0143906 A1 | 10/2002 | Tormasov et al. |
| 7,496,959 B2 | 2/2009 | Adelstein et al. | | 2002/0150239 A1 | 10/2002 | Carny et al. |
| 7,509,492 B2 | 3/2009 | Boyen et al. | | 2002/0152302 A1 | 10/2002 | Motoyama et al. |
| 7,512,810 B1 | 3/2009 | Ryan | | 2002/0156726 A1 | 10/2002 | Kleckner et al. |
| 7,539,867 B2 | 5/2009 | Bolosky et al. | | 2002/0157016 A1 | 10/2002 | Russell et al. |
| 7,555,558 B1 | 6/2009 | Kenrich et al. | | 2002/0162104 A1 | 10/2002 | Raike et al. |
| 7,562,232 B2 | 7/2009 | Zuili et al. | | 2002/0165870 A1 | 11/2002 | Chakraborty et al. |
| 7,565,683 B1 | 7/2009 | Huang et al. | | 2002/0166053 A1 | 11/2002 | Wilson |
| 7,631,184 B2 | 12/2009 | Ryan | | 2002/0169963 A1 | 11/2002 | Seder et al. |
| 7,681,034 B1 | 3/2010 | Lee et al. | | 2002/0169965 A1 | 11/2002 | Hale et al. |
| 7,698,230 B1 | 4/2010 | Brown et al. | | 2002/0172367 A1 | 11/2002 | Mulder et al. |
| 7,702,909 B2 | 4/2010 | Vainstein | | 2002/0174030 A1 | 11/2002 | Praisner et al. |
| 7,703,140 B2 | 4/2010 | Nath et al. | | 2002/0174109 A1 | 11/2002 | Chandy et al. |
| 7,707,427 B1 | 4/2010 | Kenrich et al. | | 2002/0174415 A1 | 11/2002 | Hines |
| 7,729,995 B1 | 6/2010 | Alain et al. | | 2002/0176572 A1 | 11/2002 | Ananth |

| | | | | | | |
|---|---|---|---|---|---|---|
| 2002/0178271 A1* | 11/2002 | Graham et al. ............... 709/229 | | 2004/0068664 A1 | 4/2004 | Nachenberg et al. |
| 2002/0184217 A1 | 12/2002 | Bisbee et al. | | 2004/0073660 A1 | 4/2004 | Toomey |
| 2002/0184488 A1 | 12/2002 | Amini et al. | | 2004/0073718 A1 | 4/2004 | Johannessen et al. |
| 2002/0194484 A1 | 12/2002 | Bolosky et al. | | 2004/0088548 A1 | 5/2004 | Smetters et al. |
| 2002/0198798 A1 | 12/2002 | Ludwig et al. | | 2004/0098580 A1 | 5/2004 | DeTreville |
| 2003/0005168 A1 | 1/2003 | Leerssen et al. | | 2004/0103202 A1 | 5/2004 | Hildebrand et al. |
| 2003/0009685 A1 | 1/2003 | Choo et al. | | 2004/0103280 A1 | 5/2004 | Balfanz et al. |
| 2003/0014391 A1 | 1/2003 | Evans et al. | | 2004/0117371 A1 | 6/2004 | Bhide et al. |
| 2003/0023559 A1 | 1/2003 | Choi et al. | | 2004/0131191 A1 | 7/2004 | Chen et al. |
| 2003/0026431 A1 | 2/2003 | Hammersmith | | 2004/0133544 A1 | 7/2004 | Kiessig et al. |
| 2003/0028610 A1 | 2/2003 | Pearson | | 2004/0158586 A1 | 8/2004 | Tsai |
| 2003/0033528 A1 | 2/2003 | Ozog et al. | | 2004/0186845 A1 | 9/2004 | Fukui |
| 2003/0037029 A1 | 2/2003 | Holenstein et al. | | 2004/0193602 A1 | 9/2004 | Liu et al. |
| 2003/0037133 A1 | 2/2003 | Owens | | 2004/0193905 A1 | 9/2004 | Lirov et al. |
| 2003/0037237 A1 | 2/2003 | Abgrall et al. | | 2004/0193912 A1 | 9/2004 | Li et al. |
| 2003/0037253 A1* | 2/2003 | Blank et al. ................... 713/200 | | 2004/0199514 A1 | 10/2004 | Rosenblatt et al. |
| 2003/0046176 A1 | 3/2003 | Hynes | | 2004/0205576 A1 | 10/2004 | Chikirivao et al. |
| 2003/0046238 A1 | 3/2003 | Nonaka et al. | | 2004/0215956 A1 | 10/2004 | Venkatachary et al. |
| 2003/0046270 A1 | 3/2003 | Leung et al. | | 2004/0215962 A1 | 10/2004 | Douceur et al. |
| 2003/0050919 A1 | 3/2003 | Brown et al. | | 2004/0243853 A1 | 12/2004 | Swander et al. |
| 2003/0051039 A1 | 3/2003 | Brown et al. | | 2004/0254884 A1 | 12/2004 | Haber et al. |
| 2003/0056139 A1 | 3/2003 | Murray et al. | | 2005/0021467 A1 | 1/2005 | Franzdonk |
| 2003/0061506 A1 | 3/2003 | Cooper | | 2005/0021629 A1 | 1/2005 | Cannata et al. |
| 2003/0074580 A1 | 4/2003 | Knouse et al. | | 2005/0028006 A1 | 2/2005 | Leser et al. |
| 2003/0078959 A1 | 4/2003 | Yeung et al. | | 2005/0039034 A1 | 2/2005 | Doyle et al. |
| 2003/0079175 A1 | 4/2003 | Limantsev | | 2005/0050098 A1 | 3/2005 | Barnett |
| 2003/0081784 A1 | 5/2003 | Kallahalla et al. | | 2005/0071275 A1 | 3/2005 | Vainstein et al. |
| 2003/0081785 A1 | 5/2003 | Boneh et al. | | 2005/0071657 A1 | 3/2005 | Ryan |
| 2003/0081787 A1 | 5/2003 | Kallahalla et al. | | 2005/0071658 A1 | 3/2005 | Nath et al. |
| 2003/0088517 A1* | 5/2003 | Medoff ........................... 705/59 | | 2005/0081029 A1 | 4/2005 | Thornton et al. |
| 2003/0088783 A1 | 5/2003 | DiPierro | | 2005/0086531 A1 | 4/2005 | Kenrich |
| 2003/0093457 A1 | 5/2003 | Goldick | | 2005/0091289 A1 | 4/2005 | Shappell et al. |
| 2003/0095552 A1 | 5/2003 | Bernhard et al. | | 2005/0091484 A1 | 4/2005 | Thornton et al. |
| 2003/0099248 A1 | 5/2003 | Speciner | | 2005/0097061 A1 | 5/2005 | Shapiro et al. |
| 2003/0101072 A1 | 5/2003 | Dick et al. | | 2005/0120199 A1 | 6/2005 | Carter |
| 2003/0110169 A1 | 6/2003 | Zuili | | 2005/0138371 A1 | 6/2005 | Supramaniam |
| 2003/0110266 A1 | 6/2003 | Rollins et al. | | 2005/0138383 A1 | 6/2005 | Vainstein |
| 2003/0110280 A1 | 6/2003 | Hinchliffe et al. | | 2005/0168766 A1 | 8/2005 | Troyansky et al. |
| 2003/0110397 A1 | 6/2003 | Supramaniam | | 2005/0177716 A1 | 8/2005 | Ginter et al. |
| 2003/0115146 A1 | 6/2003 | Lee et al. | | 2005/0177858 A1 | 8/2005 | Ueda |
| 2003/0115218 A1 | 6/2003 | Bobbitt et al. | | 2005/0198326 A1 | 9/2005 | Schlimmer et al. |
| 2003/0115570 A1 | 6/2003 | Bisceglia | | 2005/0223242 A1 | 10/2005 | Nath |
| 2003/0120601 A1 | 6/2003 | Ouye | | 2005/0223414 A1 | 10/2005 | Kenrich et al. |
| 2003/0120684 A1 | 6/2003 | Zuili et al. | | 2005/0235154 A1 | 10/2005 | Serret-Avila |
| 2003/0126434 A1 | 7/2003 | Lim et al. | | 2005/0256909 A1 | 11/2005 | Aboulhosn et al. |
| 2003/0132949 A1 | 7/2003 | Fallon et al. | | 2005/0268033 A1 | 12/2005 | Ogasawara et al. |
| 2003/0154381 A1 | 8/2003 | Ouye | | 2005/0273600 A1 | 12/2005 | Seeman |
| 2003/0154396 A1 | 8/2003 | Godwin et al. | | 2005/0283610 A1 | 12/2005 | Serret-Avila et al. |
| 2003/0154401 A1 | 8/2003 | Hartman et al. | | 2005/0288961 A1 | 12/2005 | Tabrizi |
| 2003/0159048 A1 | 8/2003 | Matsumoto et al. | | 2006/0005021 A1 | 1/2006 | Torrubia-Saez |
| 2003/0159066 A1 | 8/2003 | Staw et al. | | 2006/0075258 A1 | 4/2006 | Adamson et al. |
| 2003/0163704 A1 | 8/2003 | Dick et al. | | 2006/0075465 A1 | 4/2006 | Ramanathan et al. |
| 2003/0165117 A1 | 9/2003 | Garcia-Luna-Aceves et al. | | 2006/0093150 A1 | 5/2006 | Reddy et al. |
| 2003/0172280 A1 | 9/2003 | Scheidt et al. | | 2006/0101285 A1 | 5/2006 | Chen et al. |
| 2003/0177070 A1 | 9/2003 | Viswanath et al. | | 2006/0149407 A1 | 7/2006 | Markham et al. |
| 2003/0177378 A1 | 9/2003 | Wittkotter | | 2006/0168147 A1 | 7/2006 | Inoue et al. |
| 2003/0182310 A1 | 9/2003 | Charnock et al. | | 2006/0184637 A1 | 8/2006 | Hultgren et al. |
| 2003/0182579 A1 | 9/2003 | Leporini et al. | | 2006/0230437 A1 | 10/2006 | Boyer et al. |
| 2003/0182584 A1 | 9/2003 | Banes et al. | | 2006/0277316 A1 | 12/2006 | Wang et al. |
| 2003/0196096 A1 | 10/2003 | Sutton | | 2007/0006214 A1 | 1/2007 | Dubal et al. |
| 2003/0197729 A1 | 10/2003 | Denoue et al. | | 2007/0067837 A1 | 3/2007 | Schuster |
| 2003/0200202 A1 | 10/2003 | Hsiao et al. | | 2007/0083575 A1 | 4/2007 | Leung et al. |
| 2003/0204692 A1 | 10/2003 | Tamer et al. | | 2007/0192478 A1 | 8/2007 | Louie et al. |
| 2003/0208485 A1 | 11/2003 | Castellanos | | 2007/0193397 A1 | 8/2007 | Corenthin et al. |
| 2003/0217264 A1 | 11/2003 | Martin et al. | | 2008/0075126 A1 | 3/2008 | Yang |
| 2003/0217281 A1 | 11/2003 | Ryan | | 2009/0254843 A1 | 10/2009 | Van Wie et al. |
| 2003/0217333 A1 | 11/2003 | Smith et al. | | 2010/0047757 A1 | 2/2010 | McCurry et al. |
| 2003/0220999 A1 | 11/2003 | Emerson | | 2010/0199088 A1 | 8/2010 | Nath |
| 2003/0222141 A1 | 12/2003 | Vogler et al. | | | | |
| 2003/0226013 A1 | 12/2003 | Dutertre | | | FOREIGN PATENT DOCUMENTS | |
| 2003/0233650 A1 | 12/2003 | Zaner et al. | | EP | 0 674 253 A1 | 9/1995 |
| 2004/0022390 A1 | 2/2004 | McDonald et al. | | EP | 0 809 170 A1 | 11/1997 |
| 2004/0025037 A1 | 2/2004 | Hair | | EP | 0 913 966 A2 | 5/1999 |
| 2004/0039781 A1 | 2/2004 | LaVallee et al. | | EP | 0 913 967 A2 | 5/1999 |
| 2004/0041845 A1 | 3/2004 | Alben et al. | | EP | 0 950 941 A2 | 10/1999 |
| 2004/0049702 A1 | 3/2004 | Subramaniam et al. | | EP | 0 950 941 A3 | 10/1999 |
| 2004/0064507 A1 | 4/2004 | Sakata et al. | | EP | 1 107 504 B1 | 6/2001 |
| 2004/0064710 A1 | 4/2004 | Vainstein | | EP | 1 107504 A2 | 6/2001 |
| 2004/0068524 A1 | 4/2004 | Aboulhosn et al. | | EP | 1 130 492 A2 | 9/2001 |

| | | | |
|---|---|---|---|
| EP | 1 154 348 | A2 | 11/2001 |
| EP | 1324565 | A1 | 7/2003 |
| GB | 2 328 047 | A | 2/1999 |
| JP | 2001-036517 | | 2/2001 |
| JP | 2006-244044 | A | 9/2006 |
| JP | 2009-020720 | A | 1/2009 |
| WO | WO 96/41288 | A1 | 12/1996 |
| WO | WO 00/56028 | A2 | 9/2000 |
| WO | WO 01/61438 | A2 | 8/2001 |
| WO | WO 01/63387 | A2 | 8/2001 |
| WO | WO 01/63387 | A3 | 8/2001 |
| WO | WO 01/77783 | A2 | 10/2001 |
| WO | WO 01/78285 | A1 | 10/2001 |
| WO | WO 01/84271 | A2 | 11/2001 |

OTHER PUBLICATIONS

Adobe Acrobat 5.0 Classroom in a Book, Adobe Press, Jun. 26, 2001, pp. 1-4.*

Adobe Acrobat Security Settings, Acrobat 7.0, Nov. 15, 2004, pp. 1-4.*

Adobe Acrobate 5.0 User's Guide for Chambers, date unknown, pp. 1, 17, 18, 28-30.*

Amazon.com: Adobe Acrobat 5.0, web page printout.*

"Inside Encrypting File System," Part 1, from MSDN Oct. 2001 version, exact publication date is unknown but believed prior to Dec. 12, 2001.

"Inside Encrypting File System," Part 2, from MSDN Oct. 2001 version, exact publication date is unknown but believed prior to Dec. 12, 2001.

"Security with Encrypting File System," from MSDN Oct. 2001 version, exact publication date is unknown but believed prior to Dec. 12, 2001.

"How EFS Works," from MSDN Oct. 2001 version, exact publication date is unknown but believed prior to Dec. 12, 2001.

"Encrypting File System," from MSDN Oct. 2001 version, exact publication date is unknown but believed prior to Dec. 12, 2001.

"Features of EFS," from MSDN Oct. 2001 version, exact publication date is unknown but believed prior to Dec. 12, 2001.

"Windows 2000 EFS," in the Apr. 1999 issue of *Windows NT Magazine*.

Expiration Mechanism for Chipcards, IBM Technical Disclosure Bulletin, Oct. 1, 2001, UK.

McDaniel et al. "Antigone: A Flexible Framework for Secure Group Communication," Proceedings of the 8th USENIX Security Symposium, Aug. 23, 1999.

Stallings, William, "Cryptography and Network Security: Principles and Practice," 1999, pp. 333-337, Second Edition, Prentice Hall, Upper Saddle River, New Jersey.

"Affect," The American Heritage Dictionary of the English Language, Fourth Edition, Houghton Mifflin Company, 2002. Retrieved May 4, 2006 from http://dictionary.reference.com/search?q=affect.

Microsoft Windows 200 server. Windows 2000 Group Policy White Paper, 2000.

Symantec. Norton Antivirus Corporate Edition Implementation Guide, 1999.

Crocker, Steven Toye, "Multi-level cryptographic transformations for securing digital assets," U.S. Appl. No. 10/404,566, filed Mar. 31, 2003.

Crocker, Steven Toye, "Effectuating access policy changes to designated places for secured files," U.S. Appl. No. 10/259,075, filed Sep. 27, 2002.

Kenrich, Michael Frederick, "Multi-Level File Digest", U.S. Appl. No. 10/894,493, filed Jul. 19, 2004.

Kinghorn, Gary Mark, "Method and system for protecting electronic data in enterprise environment," U.S. Appl. No. 10/159,220, filed May 31, 2002.

Nath, Satyajit, "Method and system for securing digital assets using content type designations," U.S. Appl. No. 10/405,587, filed Apr. 1, 2003.

Prakash, Nalini J., "Method and apparatus for securing/unsecuring files by file crawling," U.S. Appl. No. 10/325,102, filed Dec. 20, 2002.

Rossmann, Alain, "Hybrid systems for securing digital assets," U.S. Appl. No. 10/325,013, filed Dec. 20, 2002.

A Real-Time Push-Pull Communications Model for Distributed Real-Time and Multimedia Systems, Jan. 1999, School of Computer Sciences Carnegie Mellon University, Kanaka Juvva, Raj Rajkumar.

U.S. Appl. No. 10/889,685, entitled "Method and Apparatus for Controlling the Speed Ranges of a Machine" inventor Thomas, Jul. 13, 2004, 18 pgs.

U.S. Appl. No. 10/368,277, entitled "Method and apparatus for uniquely identifying files," inventor Ouye, Feb. 18, 2003, 25 pgs.

U.S. Appl. No. 10/327,320, entitled "Security system with staging capabilities" inventor Vainstein, Dec. 20, 2002, 39 pgs.

U.S. Appl. No. 10/286,524, entitled "Security system that uses indirect password-based encryption," inventor Gutnik, Nov. 1, 2002, 38 pgs.

U.S. Appl. No. 10/242,185, entitled "Method and system for protecting encrypted files transmitted over a network" inventor Ryan, Sep. 11, 2002, 33 pgs.

U.S. Appl. No. 10/642,041, entitled "Method and system for fault-tolerant transfer of files across a network" inventor Kenrich, Aug. 15, 2003, 32 pgs.

U.S. Appl. No. 10/610,832, entitled "Method and system for enabling users of a group shared across multiple file security systems to access secured files" inventor Ryan, Jun. 30, 2003, 33 pgs.

U.S. Appl. No. 10/448,806, entitled "Method and System for Using Remote Headers to Secure Electronic Files" inventor Ryan, May 30, 2003, 35 pgs.

U.S. Appl. No. 10/074,194, entitled "Methods for idnetifying compunds that inhibit or reduce PTP1B expressions" inventor Rondinone, Feb. 12, 2002, 69 pgs.

U.S. Appl. No. 10/074,804, entitled "Secured Data Format for Access Control," inventor Garcia, Feb. 12, 2002, 108 pgs.

U.S. Appl. No. 10/075,194, entitled "System and Method for Providing Multi-location Access Management to Secured Items," inventor Vainstein et al., Feb. 12, 2002, 110 pgs.

U.S. Appl. No. 10/074,996, entitled "Method and Apparatus for Securing Electronic Data," inventor Lee et al., Feb. 12, 2002, 111 pgs.

U.S. Appl. No. 10/074,825, entitled "Method and Apparatus for Accessing Secured Electronic Data Off-line," inventor Lee et al., Feb. 12, 2002, 108 pgs.

U.S. Appl. No. 10/105,532, entitled "System and Method for Providing Different Levels of Key Security for Controlling Access to Secured Items," inventor Hildebrand et al., Mar. 20, 2002, 86 pgs.

U.S. Appl. No. 10/186,203, entitled "Method and System for Implementing Changes to Security Policies in a Distributed Security System," inventor Huang, Jun. 26, 2002, 65 pgs.

U.S. Appl. No. 10/201,756, entitled "Managing Secured Files in Designated Locations," inventor Alain, Jul. 22, 2002, 121 pgs.

U.S. Appl. No. 10/206,737, entitled "Method and System for Updating Keys in a Distributed Security System," inventor Hildebrand, Jul. 26, 2002, 60 pgs.

U.S. Appl. No. 10/246,079, entitled "Security System for Generating Keys from Access rules in a Decentralized Manner and Methods Therefor," inventor Hildebrand, Sep. 17, 2002, 78 pgs.

U.S. Appl. No. 10/259,075, entitled "Effectuating Access Policy Changes to Designated Places for Secured Files," inventor Crocker, Sep. 27, 2002, 60 pgs.

U.S. Appl. No. 10/286,575, entitled "Method and Architecture for Providing Access to Secured Data from Non-Secured Clients," inventor Vainstein, Nov. 1, 2002, 46 pgs.

U.S. Appl. No. 10/295,363, entitled "Security System Using Indirect Key Generation from Access Rules and Methods Therefor," inventor Vainstein, Nov. 15, 2002, 70 pgs.

U.S. Appl. No. 11/889,310, entitled "Methods and Systems for Providing Access Control to Electronic Data," inventor Rossmann, Aug. 10, 2007, 90 pgs.

U.S. Appl. No. 11/797,367, entitled "Method and System for Managing Security Tiers," inventor Vainstein, May 2, 2007, 11 pgs.

Microsoft Press Computer Dictionary, 1997, Microsoft Press, Third Edition, p. 426.

Search Report, completion date May 8, 2003, for European Patent Application No. EP 02 25 8530, 2 pages.

Search Report, completion date Oct. 2, 2003, for European Patent Application No. EP 02 25 8531, 2 pages.
Search Report, completion date Apr. 14, 2005, for European Patent Application No. EP 02 25 8533, 2 pages.
Search Report, completion date Mar. 16, 2005, for European Patent Application No. EP 02 25 8534, 2 pages.
Search Report, completion date Mar. 2, 2005, for European Patent Application No. EP 02 25 8535, 2 pages.
Search Report, completion date Mar. 3, 2005, for European Patent Application No. EP 02 25 8537, 2 pages.
Search Report, completion date May 12, 2005, for European Patent Application No. EP 02 25 8539, 2 pages.
Search Report, completion date Jul. 6, 2005, for European Patent Application No. EP 02 25 8529, 4 pages.
Search Report, completion date Oct. 8, 2003, for European Patent Application No. EP 02 25 8536, 2 pages.
Search Report, completion date May 8, 2003, for European Patent Application No. EP 02 25 8540, 2 pages.
Examination Report, completion date Jun. 18, 2008, for European Patent Application No. EP 02 258 532.7-1244, 6 pgs.
Office Action, dated May 10, 2005, for European Patent Application No. 02258532.7, 5 pgs.
Office Action, dated Dec. 5, 2006, for European Patent Application No. 02258532.7, 5 pgs.
Boneh et al., "Hierarchical Identity Based Encryption with Constant Size Ciphertext," Advances in Cryptology- EUROCRYPT 2005, vol. 3493, Jun. 20, 2005, pp. 440-456.
Boneh et al., "IBE Secure E-mail," Stanford University, Apr. 8, 2002, http://crypto.stanford.edu/ibe/.
Curtis et al., "Securing the Global, Remote, Mobile User," 1999 John Wiley & Sons, Ltd., Int. J. Network Mgmt. 9, pp. 9-21.
"Secure Sockets Layer (SSL): How it Works," Verisign, http://www.verisign.com/ssl/ssl-information-center/how-ssl-security-works, pp. 1-2, Printed Jan. 8, 2008.

"Column Archives," Microsoft TechNet, Professor Windows, technet.microsoft.com/enus/library/bb878075.aspx, retrieved on Dec. 3, 2009.
"Columns," Microsoft TechNet http://web.archive.org/web/20021014225142/www.microsoft.com/techneUcolumns/default. asp Oct. 14, 2002, Retrieved from web.archive.org on Dec. 3, 2009.
"eXPeriencing Remote Assistance" Microsoft TechNet—Professor Windows Oct. 2002 Oct. 15, 2002 http://web.archive.org/web/20021015165237/www.microsoft.com/techneUcolumns/profwin/, Retrieved from web.archive.org on Dec. 3, 2009.
"Migrating Accounts From Windows NT 4.0 Domains to Windows 2000," Microsoft TechNet—Professor Windows Apr. 2002, http://web.archive.org/web/20020415004611/www.microsoft.com/techneticolu mns/profwin/, Apr. 15, 2002.
"Scripting Your Windows 2000 Network, Part 1" Microsoft TechNet—Professor Windows Jun. 2002, http://web.archive.org/web/20020622055532/www.microsoft.com/techneUcolumns/profwin/ Retrieved from web.archive.org on Dec. 3, 2009.
"WayBack Machine" web.archive.org, http://web.archive.org/web/*/http://www.microsoft.com/technetlcolumns/profwin/, Retrieved on Dec. 3, 2009.
English language translation (unverified, machine-generated) of Japanese Patent Publication No. JP 2006-244044, Japanese Patent Office, Patent & Utility Model Gazette DB, 2006.
English language translation (unverified, machine-generated) of Japanese Patent Publication No. 2009-020720, Japanese Patent Office, Patent & Utility Model Gazette DB, 2009.
English language abstract for Japanese Appl. No. 2001-036517, filed Feb. 9, 2001, 1 pg.
Botha et al., "Access Control in Document-Centric Workflow Systems- An Agent-Based Approach," Computers & Security, vol. 20:6, Sep. 2001, pp. 525-532.
Botha et al., "Separation of Duties for Access Control Enforcement in Workflow Environments," IBM, 2001.

* cited by examiner

METHOD AND SYSTEM FOR RESTRICTING USE OF A CLIPBOARD APPLICATION

BACKGROUND OF THE INVENTION

1. Field of the Invention

The present invention relates generally to restricting access to documents on computers. More particularly, the present invention relates to a method and system for preventing unauthorized copying of content from a secured document in one application program to another application program.

2. Description of the Related Art

The Internet is the fastest growing telecommunications medium in history. The growth and the easy access it affords have significantly enhanced the opportunity to use advanced information technology for both the public and private sectors. The Internet also provides unprecedented opportunities for interaction and data sharing among businesses and individuals.

Unfortunately, however, the advantages provided by the Internet come with a significantly greater element of risk to the ownership, copyright, piracy, security and integrity of information. For example, one can easily copy an article from a web site into his own computer, and then use the unauthorized copy for his own purposes. In particular, anyone using a web browser application to view an article posted at a web site on the Internet can easily copy some or all of the article by simply highlighting the desired portion of the article, and then selecting a "copy" command made available by the web browser application. The copied text can thereafter be literally used for any purpose. Such unauthorized copying of information or content presents serious concerns for electronic publishers and others.

Furthermore, numerous proprietary and sensitive documents are created daily in a wide range of industries. Although measures may be taken to secure these documents, such as password protection or encryption, once these documents are displayed by a web browser or other application, one can normally perform a "copy" command to copy some or all of a document being displayed into a designated region in memory referred to as a buffer. In Microsoft Windows applications, the buffer is referred to as a clipboard which is provided by a clipboard application that is part of the Windows operating system. A "copy" command stores selected content to the clipboard and a "paste" command retrieves content from the clipboard. Once content has been copied to the clipboard, it remains in the clipboard until replaced by a different set of content. Hence, content in the clipboard can be repeatedly copied to as many different documents as the user desires.

One of the features of the clipboard is that it can be accessed by most application program running on the computer. As a result, the user is not limited to inserting the copied content into the same document from which it was copied from. Rather, the content stored in the clipboard can be placed within any document displayed by the computer. For example, the user can select a portion of text from a document created with a word processing application and copy it to the clipboard, switch to another text document created with the same or different word processing program, and paste it into that document from the clipboard. In the same manner, the user can copy the content from the clipboard into a non-text document, such as a drawing document created with a graphics application.

Thus, there is a need for techniques or mechanisms to control clipboard usage when content from a secured document is being copied.

SUMMARY OF THE INVENTION

Broadly speaking, the invention relates to techniques or mechanisms for controlling copying of content from a secured file or secured document. In one embodiment, the techniques or mechanisms operate to control clipboard usage such that content from a secured document of one application is not able to be copied to another application or a different document of another application by way of a clipboard. According to another embodiment, alternate content can be copied to another application or a different document of another application instead of the content from the secured document.

The invention can be implemented in numerous ways including, a method, system, device, and a computer readable medium. Several embodiments of the invention are discussed below.

As a computer-implemented method for restricting use of a clipboard application in a multi-application computing environment, one embodiment of the invention includes at least the acts of: receiving a copy selection associated with designated content of a source file being displayed by a source application; determining whether the source file is a secured file; and preventing subsequent usage of the designated content in a destination application via the clipboard application when the determining determines that the source file is a secured file.

As a computer-implemented method for restricting use of a clipboard application in a multi-application computing environment, another embodiment of the invention includes at least the acts of: receiving a copy selection associated with designated content of a source file being displayed by a source application; determining whether the source file is a secured file; and preventing storage of the designated content to the clipboard application when the determining determines that the source file is a secured file.

As a computer-implemented method for restricting use of a clipboard application in a multi-application computing environment, still another embodiment of the invention includes at least the acts of: receiving a copy selection associated with designated content of a source file being displayed by a source application; initially storing the designated content to the clipboard application; subsequently determining whether the source file is a secured file; and replacing the designated content stored in the clipboard application with alternate content when the determining determines that the source file is a secured file.

As a computer-implemented method for restricting use of a clipboard application in a multi-application computing environment, yet another embodiment of the invention includes at least the acts of: launching a first application when a request to access a file is received; determining, in an operating system supporting the multi-application computing environment, whether the file being requested is secured; and loading the file in clear mode into the first application while activating a clipboard security monitor when the file is determined to be secured, wherein the clipboard security monitor ensures that no contents in the secured file can be copied into a second application.

As a computer readable medium including at least computer program code for restricting use of a clipboard application in a multi-application computing environment, one embodiment of the invention includes at least: computer program code for receiving a copy selection associated with designated content of a source file being displayed by a source application; computer program code for determining whether the source file is a secured file; and computer program code for preventing subsequent usage of the designated content in a destination application via the clipboard application when it is determined that the source file is a secured file.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to techniques or mechanisms for controlling copying of content from a secured file or secured document. In one embodiment, the techniques or mechanisms operate to control clipboard usage such that content from a secured document of one application is not able to be copied to another application or a different document of another application by way of a clipboard. According to another embodiment, alternate content can be copied to another application or a different document of another application instead of the content from the secured document.

As used herein, a secured file or secured document can be considered to be interchangeable, though a secured document is one type of secured file. Both secured file and secured document pertain to a type of electronic data that includes, but is not limited to, various types of documents, multimedia files, data, executable codes, images and texts. The secure nature of the files or documents is such that the data cannot be accessed without a priori knowledge. One example of the a priori knowledge is a password. Another example of the a priori knowledge is a file key available only to an authenticated user.

Embodiments of this aspect of the invention are discussed below with reference to FIGS. 1-10. However, those skilled in the art will readily appreciate that the detailed description given herein with respect to these figures is for explanatory purposes as the invention extends beyond these limited embodiments.

Figure 1:
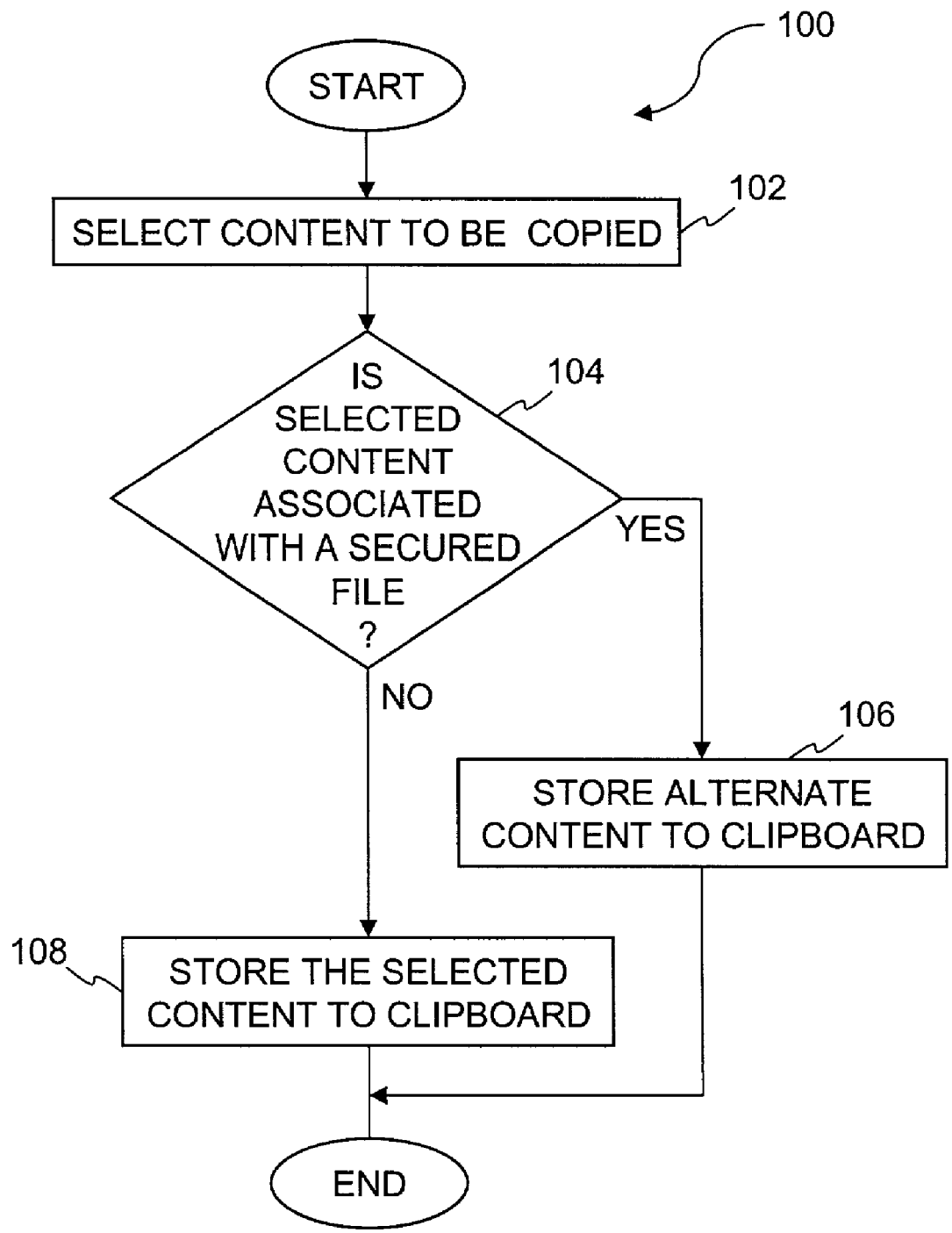
FIG. 1 is a flow diagram of copy control processing according to one embodiment of the invention.

FIG. 1 is a flow diagram of copy control processing 100 according to one embodiment of the invention. The copy control processing 100 operates to control the storage of content to a clipboard. Here, the clipboard pertains to an application clipboard provided by a software application which operates to store content to memory and allows such content to be later retrieved and utilized (e.g., pasted) in another document of the same application or another application.

The copy control processing 100 initially selects 102 content to be copied. The content to be copied can be selected 102 in a variety of different ways. For example, in one embodiment, the content to be copied can be selected by using a pointing device to highlight the content to be copied. Typically, the selected content represents a portion of content being displayed on a display screen of a computing device. However, the selected content can also pertain to an entire document.

Next, a decision 104 determines whether the selected content is associated with a secured file. When the decision 104 determines that the selected content is associated with a secured file, then alternate content is stored 106 to the clipboard. Here, because the selected content is associated with a secured file, the selected content is not permitted to be copied to the clipboard. Alternatively, if the selected content was initially stored to the clipboard, the selected content would be removed from the clipboard. In either case, the alternate content is stored 106 to the clipboard.

The alternate content can take various forms and will typically vary with implementation. As one example, the alternate content can simply be blank (i.e., no content). As another example, the alternate content can be a predetermined message, such as a message that secured content cannot be copied. Still another example of alternate content is to scramble the selected content such that it is not user-discernable.

On the other hand, when the decision 104 determines that the selected content is not associated with a secured file, then the selected content is stored 108 to the clipboard. Here, the clipboard essentially operates in a conventional fashion, such that the selected content is stored to the clipboard and thus may be subsequently retrieved and utilized elsewhere. Following the operations 106 and 108, the copy control processing 100 is complete and ends.

Figure 2:
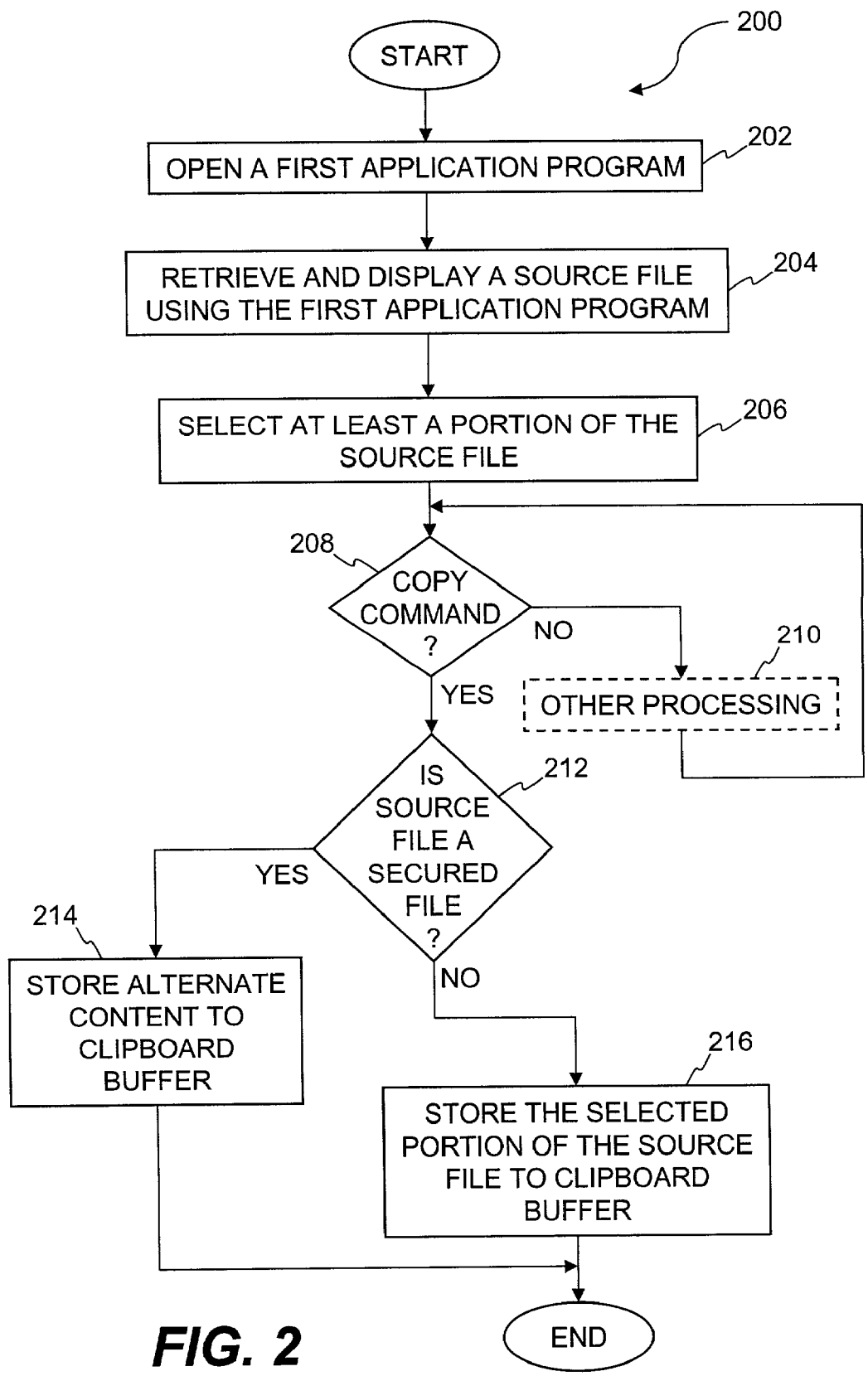
FIG. 2 is a flow diagram of clipboard copy processing according to one embodiment of the invention.

FIG. 2 is a flow diagram of clipboard copy processing 200 according to one embodiment of the invention. The clipboard copy processing 200 operates to store content to a clipboard application when a copy command is activated.

The clipboard copy processing 200 initially opens 202 a first application program. A source file is then retrieved and displayed 204 using the first application program. Next, at least a portion of the source file is selected 206. Here, the source file is displayed using the first application program and thus a user can interact with the first application program via its Graphical User Interface (GUI) to select at least a portion of the source file that is to be copied. Thereafter, the clipboard copy processing 200 determines 208 whether a copy command has been initiated.

When the decision 208 determines that a copy command has not been received, then other processing 210 can potentially be performed. The other processing 210 can perform a wide variety of other actions (e.g., commands supported by the first application program). Following the other processing 210, if any, the clipboard copy processing 200 returns to repeat the decision 208.

On the other hand, when the decision 208 determines that a copy command has been received, then a decision 212 determines whether the source file is a secured file. When the decision 212 determines that the source file is a secured file, then alternate content is stored 214 to a clipboard buffer. The clipboard buffer represents a storage area associated with a clipboard application. As noted above with respect to FIG. 1, the alternate content can take a variety of different forms. In addition, the clipboard copy processing 200 could support usage of a plurality of different alternate contents. In such case, the clipboard copy processing 200 could first identify or receive a selection pertaining to one of the available alternate contents, and then proceed to store the selected or identified alternate content to the clipboard buffer. Alternatively, when the decision 212 determines that the source file is not a secured file, then the selected portion of the source file is stored 216 to the clipboard buffer. Following the operations 214 and 216, the clipboard copy processing 200 is complete and ends.

Figure 3:
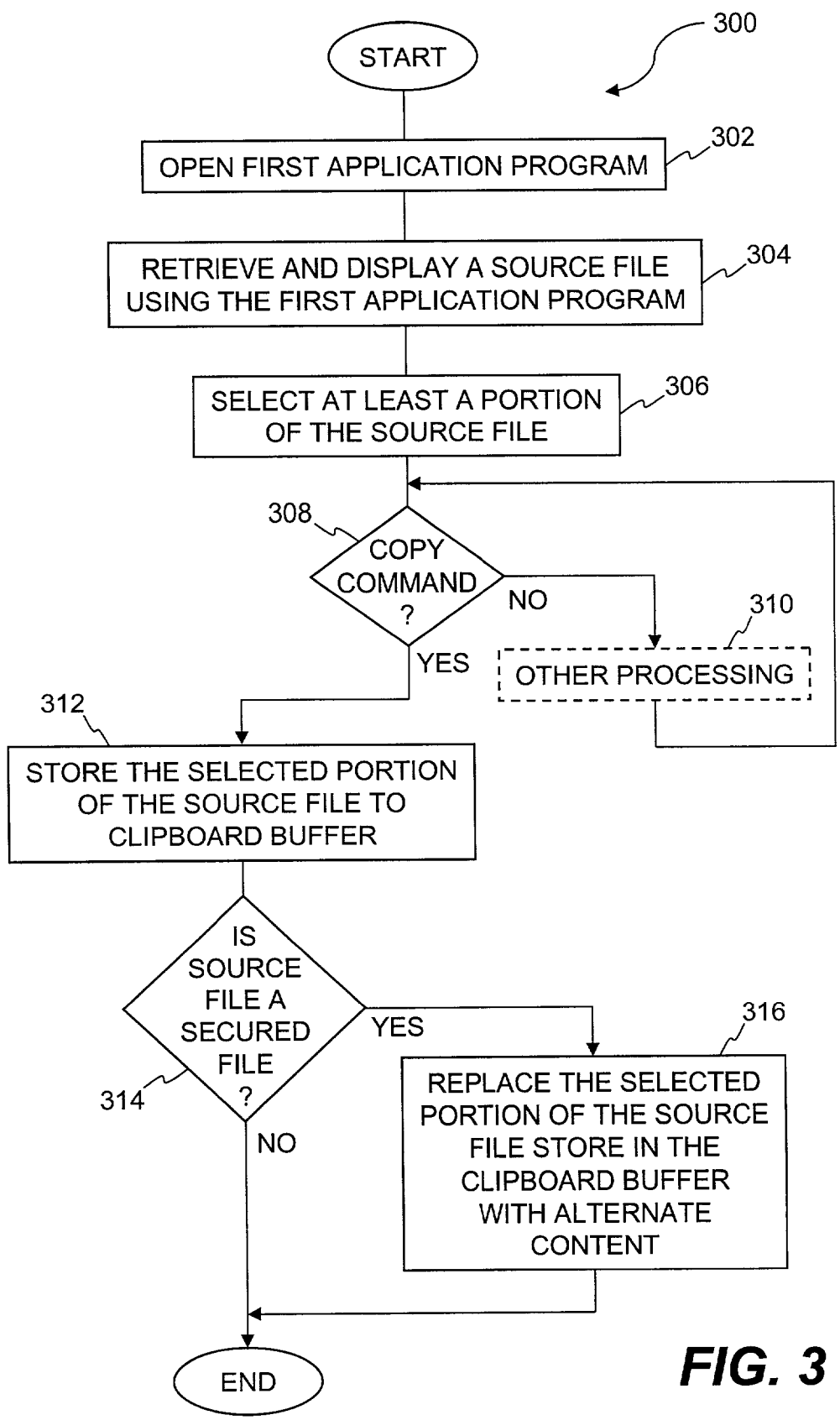
FIG. 3 is a flow diagram of clipboard copy processing according to another embodiment of the invention.

FIG. 3 is a flow diagram of clipboard copy processing 300 according to another embodiment of the invention. The clipboard copy processing 300 operates to store content to a clipboard application when a copy command is selected.

The clipboard copy processing 300 initially opens 302 a first application program. A source file is then retrieved and displayed 304 using the first application program. Next, at least a portion of the source file is selected 306. Here, the source file is displayed using the first application program and thus a user can interact with the first application program via its GUI to select at least a portion of the source file that is to be copied.

Next, a decision 308 determines whether a copy command has been received. At this point a user can interact with the operating system or the first application program to copy the selected portion of the source file. On the other hand, other commands, operations or actions can also be performed at this time. Hence, when the decision 308 determines that a copy command has not been received, then other processing 310 can potentially be performed. Following the other processing 310, if any, the clipboard copy processing 300 returns to repeat the decision 308.

Once the decision 308 determines that a copy command has been received, then the selected portion of the source file is stored 312 to a clipboard buffer. The clipboard buffer is a memory resource that is allocated to the clipboard application. Next, a decision 314 determines whether the source file is a secured file. When the decision 314 determines that the source file is a secured file, then the selected portion of the source file that has been stored in the clipboard buffer is replaced 316 with alternate content. As previously noted, the alternate content can take a variety of different forms or formats. Following the operation 316, as well as directly following the decision 314 when the source file is not a secured file, the clipboard copy processing 300 is complete and ends. Hence, the clipboard copy processing 300 serves to operate a clipboard application such that secured content is not able to be copied to unsecure applications or documents.

Figure 4:
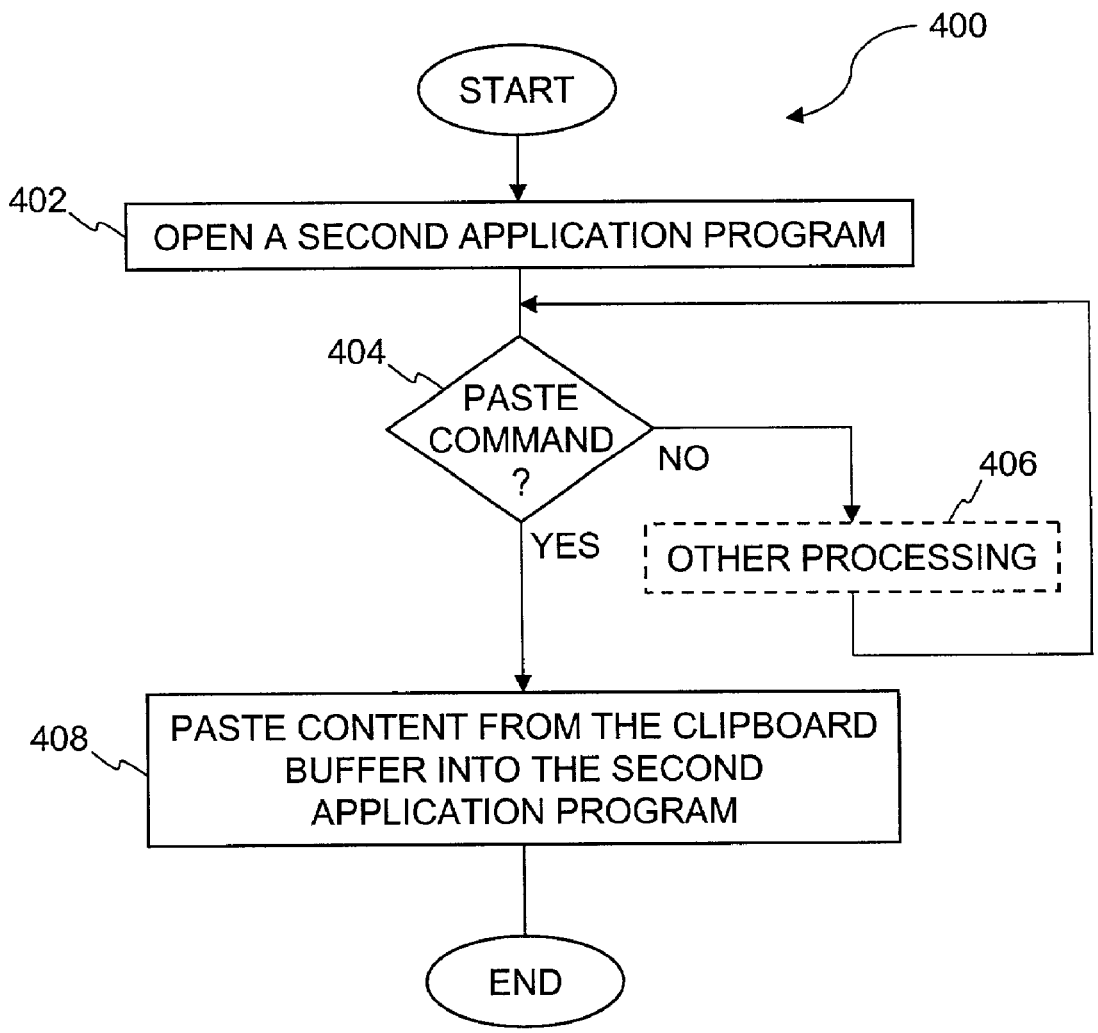
FIG. 4 is a flow diagram of clipboard paste processing according to one embodiment of the invention.

FIG. 4 is a flow diagram of clipboard paste processing 400 according to one embodiment of the invention. The clipboard paste processing 400 pertains to processing associated with a paste command. The clipboard paste processing 400 typically follows after the clipboard copy processing 200 illustrated in FIG. 2 or the clipboard copy processing 300 illustrated in FIG. 3.

The clipboard paste processing 400 initially opens 402 a second application program. The second application program can also be referred to as a destination application program. Next, a decision 404 determines whether a paste command has been received. When the decision 404 determines that a paste command has not yet been received, other processing 406 can potentially be performed. Following the other processing 406, if any, the clipboard paste processing 400 returns to repeat the decision 404 and subsequent blocks. On the other hand, when the decision 404 determines that a paste command has been received, then the content from the clipboard buffer is pasted 408 into the second application program.

Figure 5:
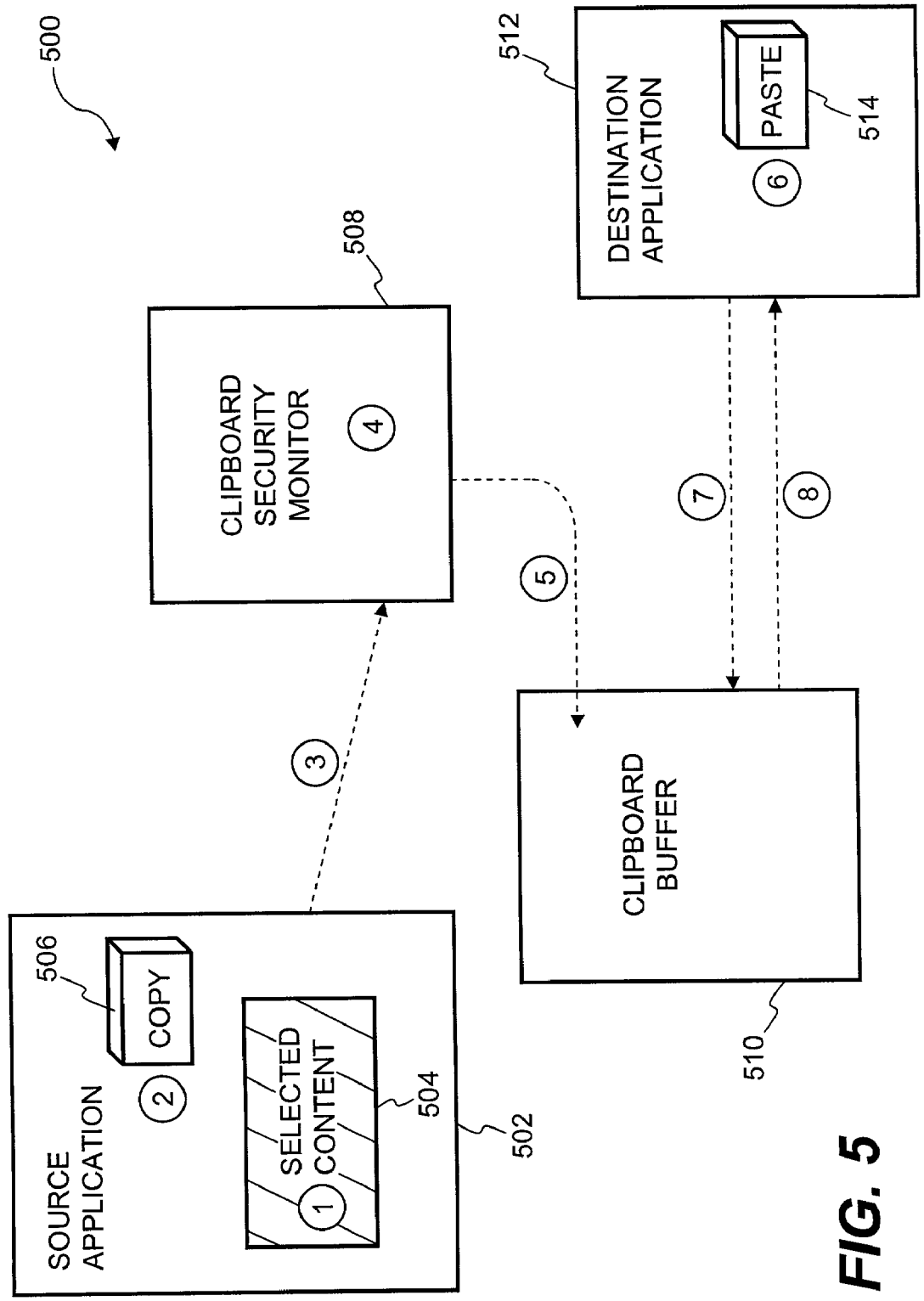
FIG. 5 illustrates a first representative copy operation according to one embodiment of the invention.

FIG. 5 illustrates a first representative copy operation 500 according to one embodiment of the invention. The first representative copy operation 500, for example, pertains to the clipboard copy processing 200 illustrated in FIG. 2 and the clipboard paste processing 400 illustrated in FIG. 4.

The procedures performed by the first representative copy operation 500 is as follows. First, a source application 502 is activated such that selected content 504 can be identified (e.g., selected). After the selected content 504 has been identified, a copy button 506 can be activated (e.g., by a button press). The copy button 506 is typically a GUI component displayed on a display screen that is "pressed" (i.e., clicked-on) through use of a pointing device. After the copy button 506 is activated, the selected content 504 is sent to a clipboard security monitor 508. At the clipboard security monitor 508, a determination is made as to whether or not the selected content is permitted to be stored to a clipboard buffer 510. In this regard, the clipboard security monitor 508 can examine information pertaining to the source application 502 or a source file having the selected content 504 therein. In any case, when the clipboard security monitor 508 determines that the source application or the source file is a secured item, then the selected content 504 is not permitted to be stored to the clipboard buffer 510. On the other hand, when the source application and the source file are not secured items, then the selected content 504 can be stored to the clipboard buffer 510. Further, in the case in which the selected content 504 is not permitted to be stored to the clipboard buffer 510, alternate content can instead be stored to the clipboard buffer 510.

Subsequently, at a destination application wherein the previously selected content is to be reused, a paste button 514 is activated (e.g., by a button press). Then, the destination application 512 requests and receives (i.e., retrieves) the content previously stored to the clipboard buffer 510. The destination application 512 can then insert the retrieved content into a document or file being displayed by the destination application 512. Hence, in the case in which alternate content was instead stored to the clipboard buffer 510, the retrieved content provided to the destination application 512 is merely the alternate content and not the selected content 504. Consequently, according to the first representative copy operation 500, secured items cannot be copied to and reused from a clipboard buffer.

Figure 6:
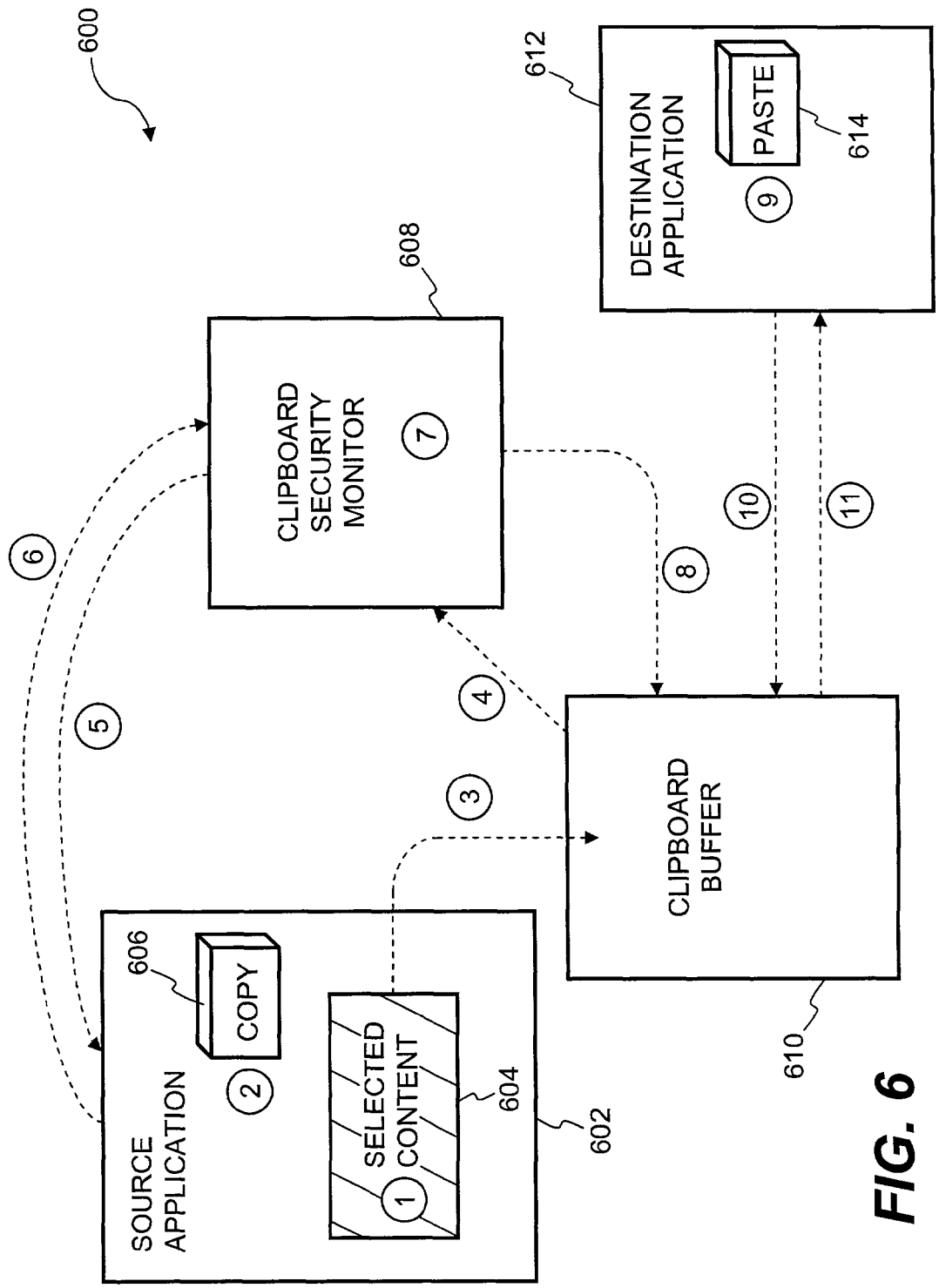
FIG. 6 is a block diagram of a second representative copy operation according to another embodiment of the invention.

FIG. 6 is a block diagram of a second representative copy operation 600 according to another embodiment of the invention. The second representative copy operation 600, for example, pertains to the clipboard copy processing 300 illustrated in FIG. 3 and the clipboard paste processing 400 illustrated in FIG. 4.

The procedures performed by the second representative copy operation 600 are as follows. A source application 602 initially displays a source file from which selected content 604 is identified (selected). Then, a copy button 606 can be activated to cause the selected content 604 to be delivered and stored in a clipboard buffer 610. Typically, the clipboard buffer is memory storage associated with a clipboard application. A clipboard security monitor 608 detects (or is notified of) the storage of the selected content 604 to the clipboard buffer 610. Thereafter, the clipboard security monitor 608 can interact with the source application 602 to obtain additional information about the source application, such as whether the source application or source file is a secured item. In any case, the clipboard security monitor 608 determines whether the selected content 604 is a secured item. When the clipboard security monitor 608 determines that the selected content 604 is a secured item, then the clipboard security monitor 608 operates to clear the selected content 604 from the clipboard buffer 610. In such case, alternate content can, if desired, be stored to the clipboard buffer 610. Hence, the second representative copy operation 600 retains the selected content 604 in the clipboard buffer 610 only when the source application and/or source file are not secured items.

Then, the destination application 612 requests and receives (i.e., retrieves) the content previously stored to the clipboard buffer 610. The destination application 612 can then insert the retrieved content into a document or file being displayed by the destination application 612. Hence, in the case in which alternate content was instead stored to the clipboard buffer 610, the retrieved content provided to the destination application 612 is merely the alternate content and not the selected content 604. Consequently, according to the second representative copy operation 600, secured items cannot be reused from a clipboard buffer.

As noted above, copying content from one application to another typically involves a copy command and then a subsequent paste command. In the embodiments discussed above with respect to FIGS. 2 and 3, and the representative examples provided in FIGS. 5 and 6, the usage of the clipboard for secured content is controlled on the front end, that is, during or soon following the copy command. However, the control over the usage of the selected content can also be controlled on the back end, that is, during the paste command. Other such embodiments of the invention are discussed below with reference to FIGS. 7A, 7B and 8.

Figure 7A:
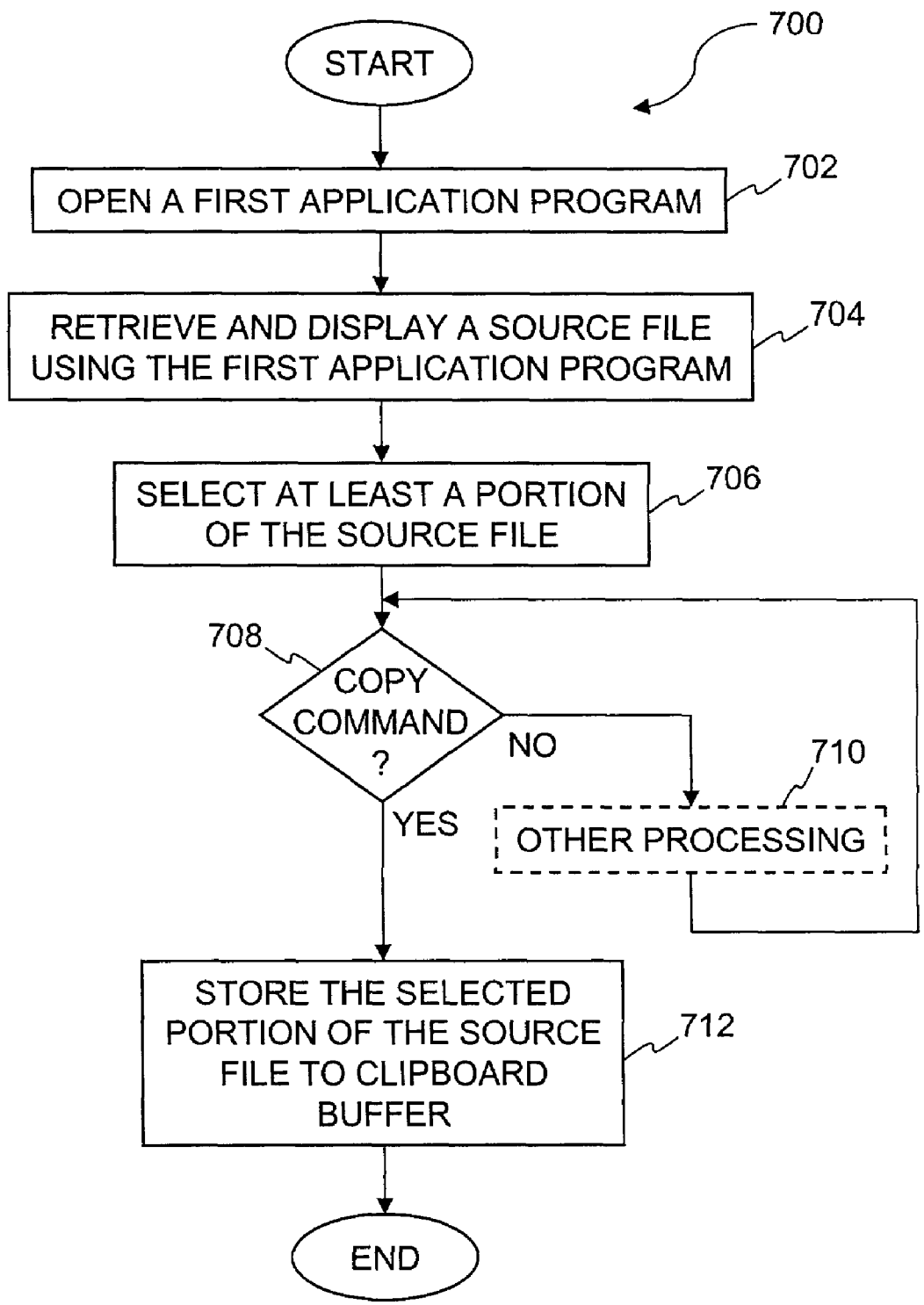
FIG. 7A is a flow diagram of clipboard copy processing according to another embodiment of the invention.

FIG. 7A is a flow diagram of clipboard copy processing 700 according to another embodiment of the invention. The clipboard copy processing 300 operates to store content to a clipboard application when a copy command is selected.

The clipboard copy processing 700 initially opens 702 a first application program. A source file is then received and displayed 704 using the first application program. Then, at least a portion of the source file is selected 706. The operations 702-706 are similar to the operations 202-206 and 302-306 discussed above in FIGS. 2 and 3, respectively.

Following the operation 706, a decision 708 determines whether a copy command has been received. When the decision 708 determines that a copy command has not been received, then other processing 710 is potentially performed. Once the other processing 710, if any, is performed, the clipboard copy processing 700 returns to repeat the decision 708. Once the decision 708 determines that a copy command has been received, then the selected portion of the source file is stored 712 to the clipboard buffer. Hence, in this embodiment, the clipboard copy processing 700 operates to store the selected portion of the source file to the clipboard buffer without regard to whether the source file or the first application program are of a secure nature. However, if desired, a flag or other indicator can also be stored in the clipboard buffer or elsewhere to indicate whether the selected content stored in the clipboard buffer is a secured item.

Figure 7B:
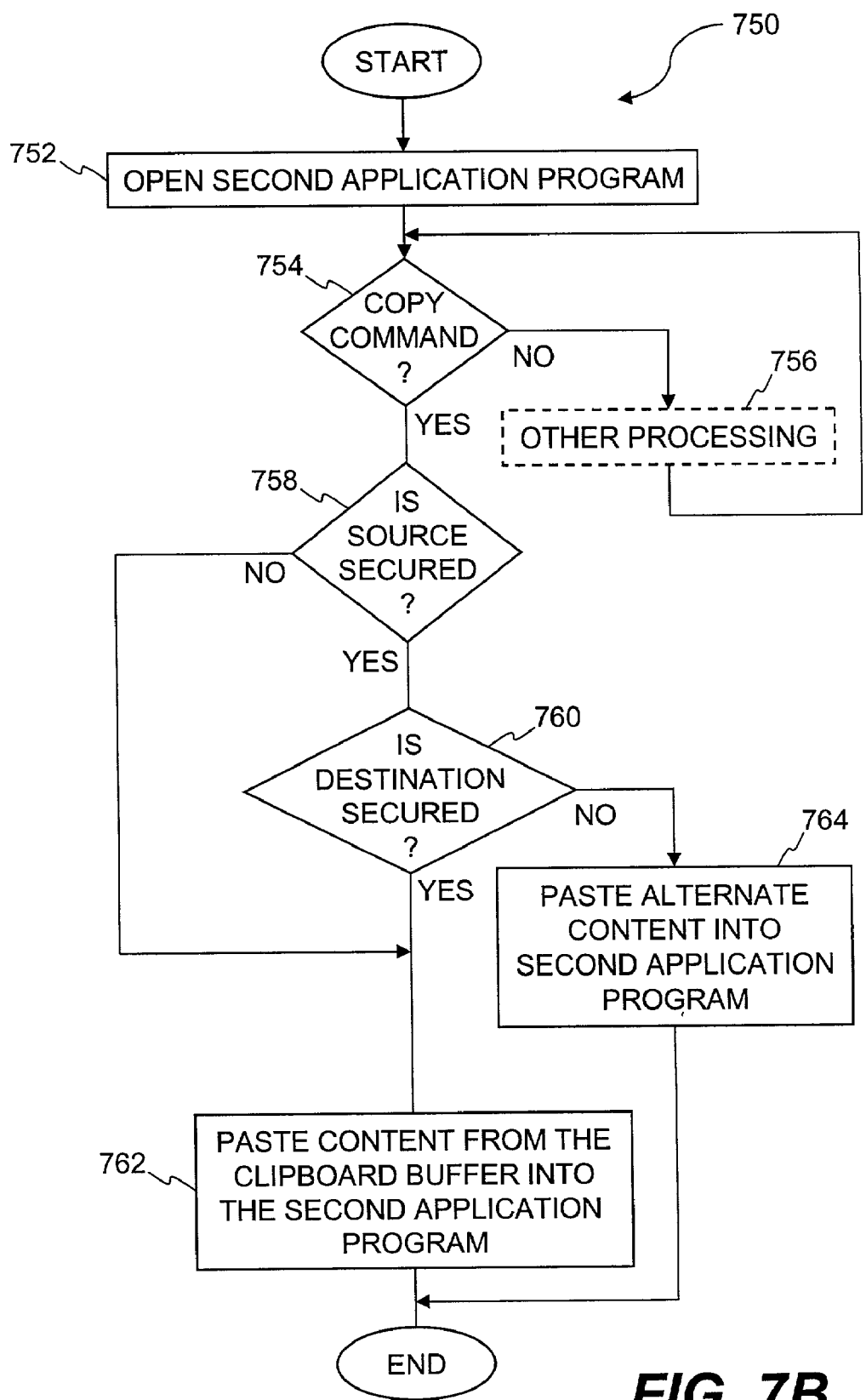
FIG. 7B is a flow diagram of clipboard paste processing according to another embodiment of the invention.

FIG. 7B is a flow diagram of clipboard paste processing 750 according to another embodiment of the invention. The clipboard paste processing 750 pertains to processing associated with a paste command. The clipboard paste processing 750 reflects processing associated with a paste command which follows a previously processed copy command by the clipboard copy processing 700.

The clipboard paste processing 750 initially opens 752 a second application program. The second application program is also referred to as a destination application program. Next, a decision 754 determines whether a paste command has been received. When the decision 754 determines that a paste command has not been received, then other processing 756 is potentially performed. Following the other processing 756, if any, the clipboard paste processing 750 returns to repeat the decision 754.

Once the decision 754 determines that a paste command has been received, a decision 758 determines whether the source is secure. The source, for example, can refer to the first application program, the source file or the selected content. When the decision 758 determines that the source is secure, then a decision 760 determines whether the destination is secure. When the decision 760 determines that the destination is secure, then the content from the clipboard buffer can be pasted 762 into the second application program. Here, in the case in which both the source and the destination are deemed secure, the selected content is permitted to be pasted from the clipboard buffer into the second application program that has requested such content.

However, when the decision 760 determines that the destination is not secure, then alternate content can be pasted 764 into the second application program. As noted above, the alternate content can take a variety of different forms depending upon implementation. Still further, when the decision 758 determines that the source is not secure, then the decision 760 can be bypassed such that the content is pasted 762 from the clipboard buffer into the second application program. Following the operations 762 or 764, the clipboard paste processing 750 is complete and ends.

According to one implementation, the decision 758 can utilize a flag or other indicator that may have been stored by the clipboard copy processing 700 in determining whether the source is secure. The destination can be deemed secure if security is imposed, such as by a password or other authentication technique.

According to another implementation, the destination would be deemed unsecured unless it was the same application as the first application. As an example, a program handler returned from an operating system call (e.g. WIN32 APIs) to retrieve a source file can be compared to another program handler of a second application. If the program handlers match or they are the same program handler, then the source and destination are the same application, and thus the pasting of the selected content into the application program would be permitted. However, if the destination application was not the same as the source application, then, in this embodiment, the pasting of the content would be not permitted (instead, alternate content could be provided).

Alternatively, in Windows OS, the "active window" or "foreground window" mechanism can be utilized to determine if the selected content in a secured source file is being copied into another application. Although several windows (assuming an application activating a window) may be visible on the screen simultaneously, there is only one window that is active or receives an input from the keyboard or the mouse. By calling an appropriate API (e.g. GetActiveWindowTitle), the clipboard security monitor can be informed if the selected content has been copied into the clipboard or a second application has been activated to retrieve the selected content from the clipboard.

Figure 8:
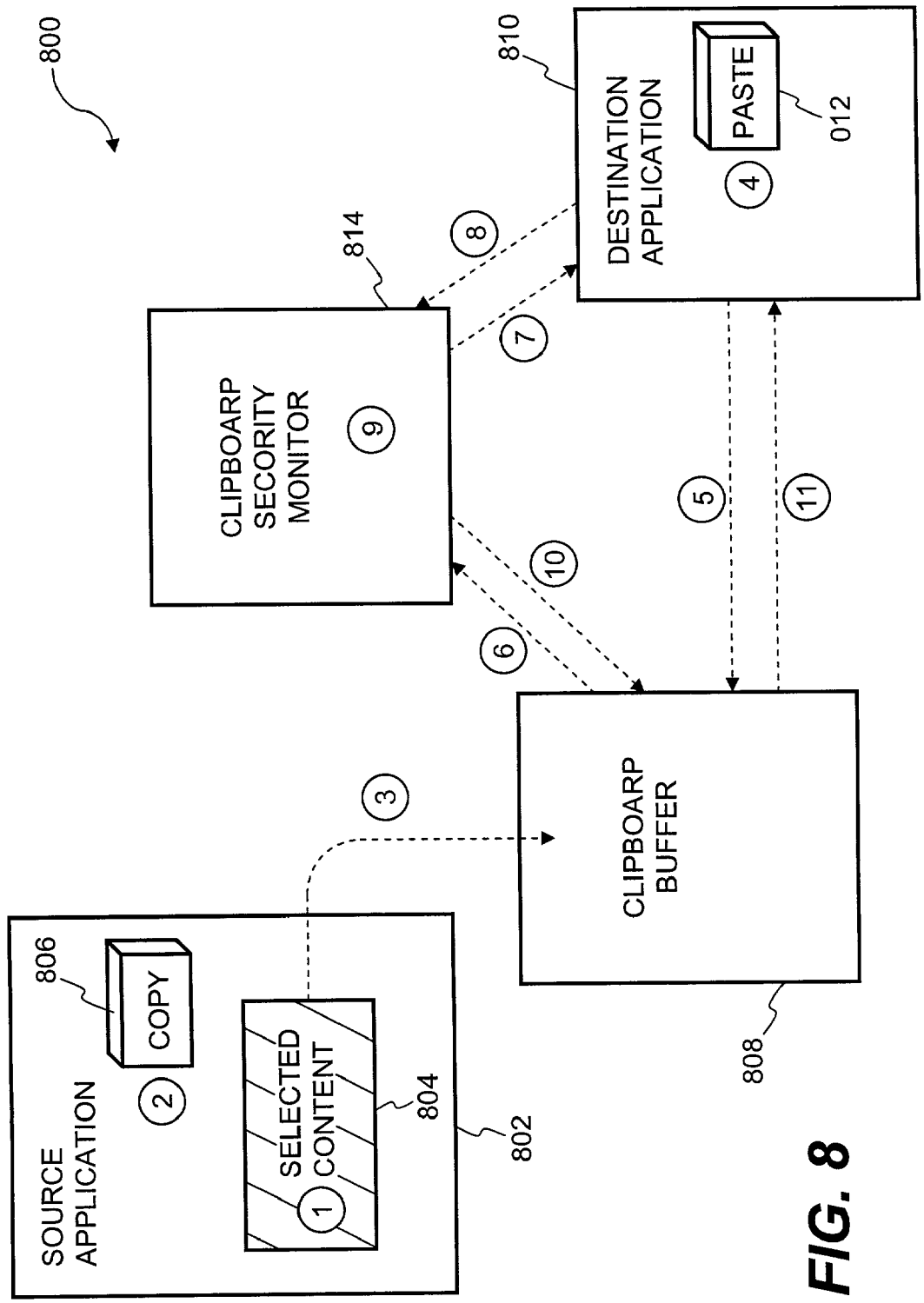
FIG. 8 is a block diagram of a third representative copy and paste operation according to one embodiment of the invention.

FIG. 8 is a block diagram of a third representative copy and paste operation 800 according to one embodiment of the invention. The third representative copy and paste operation 800, for example, pertains to the clipboard copy processing 700 illustrated in FIG. 7A and the clipboard paste processing 750 illustrated in FIG. 7B.

The procedures performed by the third representative copy and paste operation 800 are as follows. A source application 802 operates to display a source file for a user. The user can then interact with the source application 802 to select content (selected content) 804. Then, a copy button 806 can be activated to store the selected content 804 to a clipboard buffer 808. Typically, the clipboard buffer 808 is associated with a clipboard application.

Subsequently, at a destination application 810, the user activates a Paste button 812. In response, the destination application 810 requests the contents of the clipboard from the clipboard buffer 808. A clipboard security monitor 814 then (assuming the selected content is known or presumed to be secured) interacts with the clipboard buffer 808 and/or the destination application 810 to determine whether the destination application 810 is a secure application. When the clipboard security monitor 814 determines that the destination application 810 is secure, then the selected content can be permitted to be retrieved from the clipboard buffer 808 and pasted (i.e., inserted) into the destination application 810 or a file therein. Additionally, if the clipboard security monitor 814 determines that the source application 802 is not a secure application, then the selected content stored in the clipboard buffer 808 could be supplied to the destination application 810 regardless of whether the destination application was secure or not.

Most application programs (e.g., Microsoft Word or Notepad) either generate or process data in one form or another. One can readily copy data between various applications using the clipboard provided by the clipboard application. Typically, one copies a portion of data from one application into the clipboard and then pastes the portion of data into other applications as many times as desirable as long as the clipboard has not been updated. The data or content being copied can be text, image, audio or other type data or content.

The clipboard application is initiated by a user and has a very simple protocol. When the user requests a "copy" or "cut" operation to place data from a first application into the clipboard, the first application makes Application Programming Interface (API) calls to empty the clipboard and then to store the data to the clipboard. In one implementation, the first application provides the single item of data in multiple formats, so as to increase the likelihood that the eventual recipient application will understand one of them. Using this technique allows the first application to simply list the formats it supports for the data, but only has to render the data when another application actually tries to retrieve the data from the clipboard. In this way, data that is never going to be used never needs to be rendered. When the user makes a paste request, the receiving application enumerates the formats of the data in the clipboard and, having found one it likes, takes the data in that format.

Figure 9:
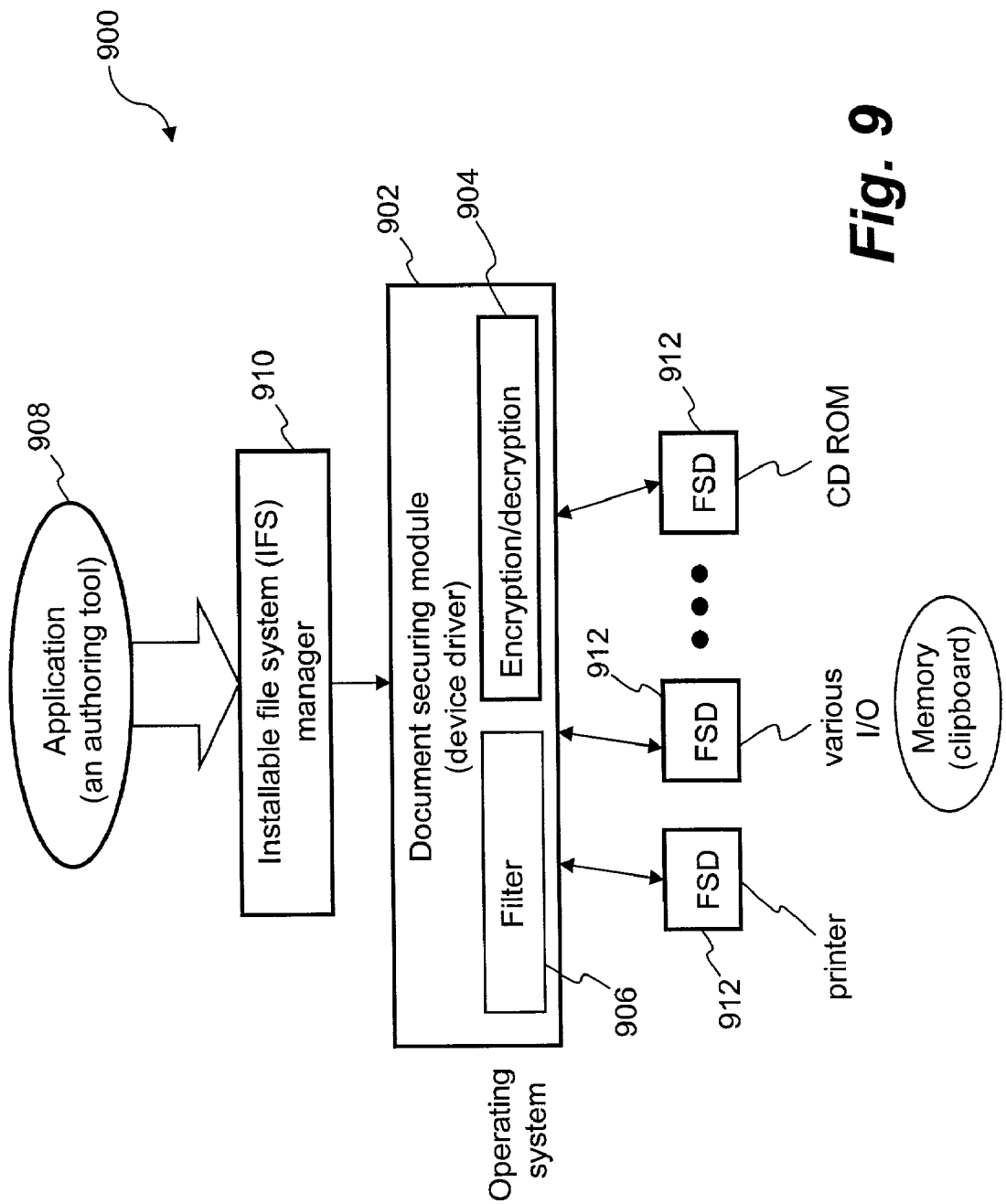
FIG. 9 illustrates a block diagram of a clipboard usage control system according to one embodiment of the invention.

FIG. 9 illustrates a block diagram of a clipboard usage control system 900 according to one embodiment of the invention. More particularly, the clipboard usage control system 900 provides an exemplary implementation of how the clipboard is blocked to a user of an application accessing a secured document while still being available for other applications accessing unsecured documents.

The clipboard usage control system 900 includes a document securing module (DSM) 902 that is configured to interface with an operating system (e.g., Microsoft Windows). When a secured document is requested, the document securing module 902 is activated without interaction or notification of the user. In one implementation, the document securing module 902 is similar to a device driver that essentially converts more general input/output instructions of an operating system to messages that a device/module being supported can understand. The device/module enclosed in the document securing module 902 is a cipher having an encryption/decryption process model 904 and a filter function 906. The encryption/decryption process model 904 encrypts a document of secure nature and decrypts a secured document when the secured document is requested. Upon detecting a secured file being accessed, the filter 906 is activated and prevents the clipboard from being used to copy secure content to other applications, particularly other unsecure applications.

In operation, a user selects a secured document that is associated with an application 908 (e.g., Microsoft Word or PowerPoint). With Microsoft Windows, an operating system (OS) access known as the ProcessID property can be used to activate an application (as an argument to the AppActivate method). The parameter ProcessID identifies the application and an event handler takes necessary parameters to continue the OS access to an Installable File System (IFS) Manager 910. The IFS Manager 910 is responsible for arbitrating access to different file system components. In particular, the IFS Manager 910 is structured as an ordinary Dynamic Link Library (DLL) with entry points for opening, closing, reading, writing files and others. With one or more flags or parameters (e.g., a file key) passed along, the access activates the document securing module 902.

According to one embodiment, the document securing module 902 resides on a local disk in a file that is structured like a Dynamically Linked Library (DLL), typically with a SYS or IFS extension, and is loaded during system initialization. Once the document securing module 902 is installed and initialized, a kernel communicates with it in terms of logical requests for file opens, reads, writes, seeks, closes, and so on. Through the IFS Manager 910, a File System Device (FSD) 912 translates these requests—using control structures and tables found on the volume itself—into requests for sector reads and writes for which it can call special kernel entry points called File System Helpers (FsHlps). The kernel passes the demands for sector I/O to an appropriate device driver and returns the results (e.g., the requested document) to the FSD 912.

Upon receiving the results from the FSD 912 indicating that the requested document is secured, document securing module 902 activates a cipher (e.g., an encryption/decryption module 904) included therein to decrypt the document. At the same time, the filter function 906 can be activated. According to one implementation, an API for the clipboard is called to virtually place a filter in front of (or in back of) the clipboard so that copied data can be restricted as to its use. The appropriate API is available from Microsoft Corporation, namely documentation pertaining to Platform Form Release, February, 2001, which is incorporated herein by reference.

On the source application side, the secured document is opened and perhaps the clear contents therein are displayed in the application. A portion of the clear contents may be selected (i.e., highlighted) for the purpose of copying into another application. When a "copy" command is initiated, the selected contents are attempted to be saved into the clipboard. The filter imposed by the filter function 906 can become effective to void the selected contents. Depending on implementation, the filter may perform differently. In one case, the filter simply blocks any copied data from being placed into the clipboard. The result is that the clipboard is empty and a user cannot transport the copied contents into another application. In another case, the filter can be configured to include a message (e.g., unauthorized copy is not permitted). When a user attempts to copy a selected portion into another application, the result is that the message (not the selected portion) is copied. In still another case, the clipboard is copied into an illegible or scrambled content corresponding to the selected portion. This, for example, can be done through a simple logical operation on the selected portion.

Figure 10:
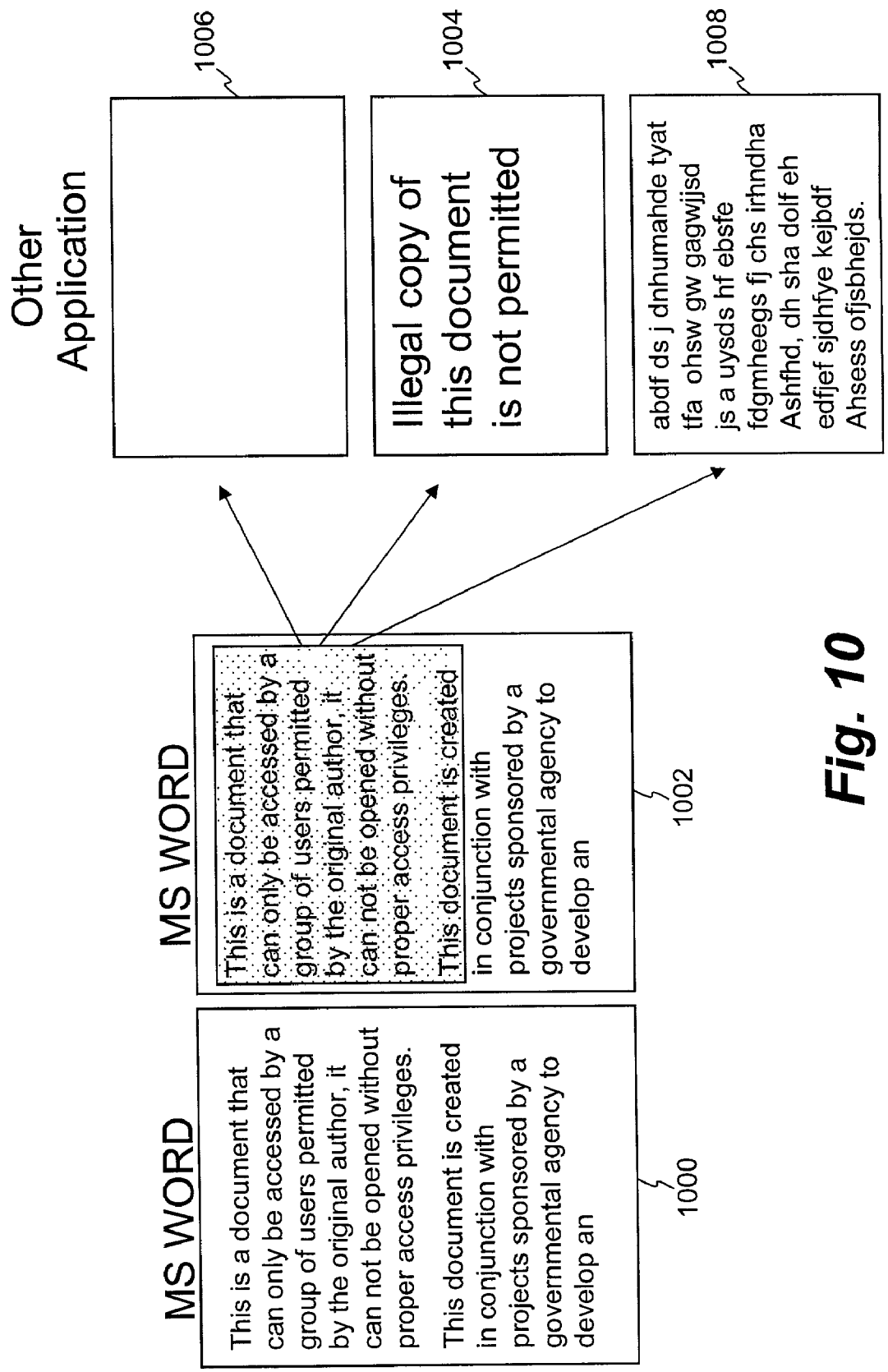
FIG. 10 shows some of the possible outcomes of a copy and paste operation from a secured document.

FIG. 10 shows some of the possible outcomes of a copy and paste operation from a secured document. As shown in FIG. 10, a window 1000 pertaining to a first application (i.e., Microsoft Windows) displays a secured document. A window 1002 represents the window 1000 after a user has selected a portion of the secured document to be copied. Following a paste command with respect to a destination document of a second application, a window 1004, 1006 or 1008 can be displayed. The window 1004 displays a message indicating that the selected portion is not permitted to be copied. The window 1006 displays a blank area as an indication that the selected portion is not able to be copied. The window 1008 displays scrambled content representing the selected portion but such is not discernable by the user.

Alternatively, when the selected portion is copied into the clipboard, the selected portion may be modified invisibly to the user. According to one embodiment, one or more special marks may be inserted into the spaces of the selected portion. These special marks are ignorant to an application. For example, a pair of Hexadecimal numbers "FF" can be inserted into the spaces between words or replace the spaces (e.g. "32" in ASCII) while the newly inserted "FF" are neither visible on a display nor printable by a printer. Even if a user was successful in copying the selected portion into the clipboard and pasting the selected portion from the clipboard to a new application, these special marks would go along with the file under the new application with the special marks invisible to users or many utility applications (e.g. printing, display or audio). As a result, it is now possible to trace down where the copied portion in a new file is original from.

The "cut" command performs a copy command and then deletes the selected content from the source document. Hence, for purposes of storing selected content to a clipboard, a cut command operates in the same manner as the above-discussed copy command.

In one embodiment, a secured file or secured document can include two parts, an attachment, referred to as a header, and an encrypted document. The header may include information regarding a file key or the file key itself that can be used to decrypt the encrypted document. The invention is preferably implemented in software, but can be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and/or executed in a distributed fashion.

The advantages of the invention are numerous. Different embodiments or implementations may yield one or more of the following advantages. One advantage of the invention is that secured documents or files being displayed are protected from having their content copied to other unsecure applications or documents. Another advantage of the invention is that a clipboard security monitor (or a document securing module) is embedded in an operating system as such the management of the clipboard is transparent to a user. Still another advantage of the invention is that a copy application is reliably managed such that secured content is not able to be copied to unsecure destinations. Still another advantage of the invention is that alternate content can be used in place of secure content that is not permitted to be copied to unsecure destinations.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for restricting use of a clipboard application, the method comprising:
   determining whether a copy selection associated with designated content of a source file being displayed by a first source application has been made;
   storing the designated content to the clipboard application;
   receiving a copy command associated with the copy selection, the copy command including a flag or indicator associated with a user;
   authenticating the user based upon the received flag or indicator; and
   determining whether the source file is a secured file, wherein the secured file includes a header having a file key available to the authenticated user, and wherein the secured file cannot be accessed without the file key.

2. The method recited in claim 1, further comprising receiving a paste selection to provide the designated content to a second destination application.

3. The method recited in claim 2, wherein the paste selection requests to paste the designated content to a destination file that is opened within the second destination application.

4. The method recited in claim 2, wherein the paste selection is a paste command.

5. The method recited in claim 1, wherein the determining operates to determine that the source file is the secured file based on security information provided by the first source application.

6. The method recited in claim 5, wherein the determining includes determining that the security information pertains to the source document.

7. The method recited in claim 1, further comprising:
   preventing subsequent usage of the designated content in a second destination application via the clipboard application in response to determining that the source file is a secured file.

8. The method recited in claim 7, wherein the preventing comprises:
   storing predetermined content to the clipboard application instead of the designated content in response to determining that the source file is the secured file.

9. The method recited in claim 7, wherein the preventing comprises:
   storing the designated content to the clipboard application in response to determining that the source file is not the secured file.

10. The method recited in claim 9, further comprising:
    receiving a paste selection to provide the designated content to the second destination application.

11. The method recited in claim 10, further comprising:
supplying the predetermined content from the clipboard application to the second destination application in response to the paste selection in response to determining that the source file is a secured file.

12. The method recited in claim 10, further comprising:
supplying the designated content from the clipboard application to the second destination application in response to the paste selection in response to determining that the source file is not a secured file.

13. The method recited in claim 7, wherein said preventing comprises:
storing scrambled content to the clipboard application in response to determining that the source file is a secured file.

14. The method recited in claim 7, wherein said preventing comprises:
storing the designated content to the clipboard application in response to determining that the source file is not a secured file.

15. The method recited in claim 14, further comprising:
receiving a paste selection to provide the designated content to the second destination application;
supplying the scrambled content from the clipboard application to the second destination application in response to the paste selection if said determining determines that the source file is a secured file; and
supplying the designated content from the clipboard application to the second destination application in response to the paste selection in response to determining that the source file is not a secured file.

16. A method for restricting use of a clipboard application, the method comprising:
receiving a copy selection associated with designated content of a source file being displayed by a first source application;
receiving a copy command associated with the copy selection, the copy command including a flag or indicator associated with a user;
authenticating the user based upon the received flag or indicator; and
determining whether the source file is a secured file, wherein the secured file includes a header having a file key available to the authenticated user, and wherein the secured file cannot be accessed without the file key, wherein said determining is performed by one or more computing devices.

17. The method recited in claim 16, further comprising storing alternate content to the clipboard application in response to determining that the source file is the secured file.

18. The method recited in claim 17, wherein the alternate content is one or more of blank content, predetermined content, or scrambled content.

19. The method recited in claim 17, further comprising:
supplying the predetermined content from the clipboard application to the second destination application in response to the paste selection in response to determining that the source file is not the secured file.

20. The method recited in claim 16, wherein further comprising:
supplying the designated content to the clipboard application in response to-determining that the source file is not the secured file.

21. The method recited in claim 20, wherein the determining operates to determine that the source file is the secured file based on security information provided by the first source application.

22. The method as recited in claim 21, wherein the determining includes deter mining that the security information pertains to the source document.

23. The method recited in claim 16, further comprising:
preventing subsequent storage of the designated content to a second destination application via the clipboard application in response to determining that the source file is the secured file.

24. A non-transitory computer readable medium having instructions stored thereon for restricting the use of a clipboard application, the instructions comprising:
instructions to receive a copy selection associated with designated content of a source file being displayed by a first source application;
instructions to receive a copy command associated with the copy selection, the copy command including a flag or indicator associated with a user;
instructions to authenticate the user based upon the received flag or indicator; and
instructions to determine whether the source file is a secured file, wherein the secured file includes a header having a file key available to the authenticated user, and wherein the secured file cannot be accessed without the file key.

25. The non-transitory computer readable medium of claim 24, the instructions further comprising:
instructions to prevent subsequent usage of the designated content in a second destination application via the clipboard application in response to determining that the source file is a secured file.

26. The non-transitory computer readable medium recited in claim 25, wherein said instructions to prevent comprise:
instructions to store blank content to the clipboard application in response to determining that the source file is a secured file.

27. The non-transitory computer readable medium recited in claim 26, wherein said method further comprises:
receiving a paste selection to provide the designated content to the second destination application;
supplying the blank content from the clipboard application to the second destination application in response to the paste selection in response to determining that the source file is a secured file; and
supplying the designated content from the clipboard application to the second destination application in response to the paste selection in response to determining that the source file is not a secured file.

28. The non-transitory computer readable medium recited in claim 25, wherein said instructions to prevent comprise:
instructions to store the designated content to the clipboard application in response to determining that the source file is not a secured file.

* * * * *

UNITED STATES PATENT AND TRADEMARK OFFICE
CERTIFICATE OF CORRECTION

PATENT NO.        : 7,950,066 B1
APPLICATION NO.   : 10/028397
DATED             : May 24, 2011
INVENTOR(S)       : Zuili It is certified that error appears in the above-identified patent and that said Letters Patent is hereby corrected as shown below:

Title Page 6, item (56), under "Other Publications", in Column 1, Line 36, delete "200" and insert -- 2000 --.

Title Page 6, item (56), under "Other Publications", in Column 2, Lines 28-29, delete "idnetifying compunds" and insert -- identifying compounds --.

Column 14, line 2, in Claim 20, delete "to-determining" and insert -- to determining --.

Column 14, line 9, in Claim 22, delete "deter mining" and insert -- determining --.

Signed and Sealed this
Twenty-third Day of August, 2011

David J. Kappos
*Director of the United States Patent and Trademark Office*